(12) United States Patent
Thomas et al.

(10) Patent No.: US 9,051,208 B2
(45) Date of Patent: Jun. 9, 2015

(54) LED CURING LAMP AND METHOD

(71) Applicant: TCG International Inc., Burnaby (CA)

(72) Inventors: Jonathan Thomas, Maple Lake, MN (US); Keith Beveridge, Edina, MN (US); David Osland, Minneapolis, MN (US); Roger Olsen, Burnsville, MN (US); Penny Chatterton, Shakopee, MN (US); Jay Bickford, Savage, MN (US)

(73) Assignee: TCG International Inc., Burnaby, B.C. (CA)

( * ) Notice: Subject to any disclaimer, the term of this patent is extended or adjusted under 35 U.S.C. 154(b) by 0 days.

(21) Appl. No.: 14/473,034

(22) Filed: Aug. 29, 2014

(65) Prior Publication Data

US 2014/0363583 A1 Dec. 11, 2014

Related U.S. Application Data

(62) Division of application No. 13/038,173, filed on Mar. 1, 2011, now Pat. No. 8,822,961.

(60) Provisional application No. 61/411,784, filed on Nov. 9, 2010, provisional application No. 61/310,465, filed on Mar. 4, 2010.

(51) Int. Cl.
| C03C 17/00 | (2006.01) |
| B29C 73/02 | (2006.01) |
| B29C 73/34 | (2006.01) |
| C03C 17/32 | (2006.01) |
| B29C 35/08 | (2006.01) |

(52) U.S. Cl.
CPC .............. *C03C 17/001* (2013.01); *B29C 73/02* (2013.01); *B29C 73/34* (2013.01); *B29C 2035/0827* (2013.01); *C03C 17/32* (2013.01)

(58) Field of Classification Search
CPC .... B29C 35/0805; B29C 73/02; B32B 43/00; C03C 27/10
USPC .............. 425/12, 13, 15; 362/397; 250/504 R
See application file for complete search history.

(56) References Cited

U.S. PATENT DOCUMENTS

| 3,562,366 | A | * | 2/1971 | Sohl ................................ 64/443 |
| 3,841,932 | A | | 10/1974 | Forler et al. |
| 3,988,400 | A | | 10/1976 | Luhman, III |
| 4,182,665 | A | | 1/1980 | Mibu et al. |
| 5,234,325 | A | * | 8/1993 | Hill .................................. 425/12 |
| 5,425,827 | A | * | 6/1995 | Campfield ...................... 156/94 |
| 5,565,217 | A | | 10/1996 | Beckert et al. |
| 5,589,018 | A | * | 12/1996 | Campfield ...................... 156/94 |
| 5,776,506 | A | * | 7/1998 | Thomas et al. ................. 425/12 |
| D400,218 | S | * | 10/1998 | Thomas ....................... D15/144 |

(Continued)

OTHER PUBLICATIONS

Exhibit A—Liquid Resins, International LTD, Prices Effective Apr. 1, 1992, Catalog No. 108, 21 Pages.

(Continued)

*Primary Examiner* — David A Vanore
(74) *Attorney, Agent, or Firm* — Merchant & Gould P.C.

(57) ABSTRACT

A curing lamp apparatus mounts to a work surface with a suction cup. A base is mounted to the suction cup. A flexible neck extends from the base to the lamp head. The lamp head includes a lamp element with first and second UV light sources which emit UV light at different wavelengths. A control circuit is located in the base. A heat sink is provided on the lamp head including a conductive plate and projecting pins. A protective housing encloses the plate and pins. A timing circuit controls the light source for automatic shut off. External or internal power is provided for the control circuit.

8 Claims, 26 Drawing Sheets

(56) References Cited

U.S. PATENT DOCUMENTS

| | | | |
|---|---|---|---|
| 6,033,507 A * | 3/2000 | Campfield | 156/94 |
| 6,139,300 A * | 10/2000 | Thomas et al. | 425/12 |
| 6,302,670 B1 * | 10/2001 | Thomas et al. | 425/12 |
| 6,685,784 B1 * | 2/2004 | Jacino et al. | 156/94 |
| 6,898,372 B2 * | 5/2005 | Boyle et al. | 392/427 |
| 7,131,752 B2 * | 11/2006 | Beveridge et al. | 362/397 |
| 8,822,961 B2 * | 9/2014 | Thomas et al. | 250/504 R |
| 2002/0181947 A1 | 12/2002 | Cao | |
| 2004/0202458 A1 * | 10/2004 | Boyle et al. | 392/427 |
| 2014/0065254 A1 * | 3/2014 | Schuepbach et al. | 425/162 |

OTHER PUBLICATIONS

Exhibit B—The Glass Mechanix, A Clear Path to your Future Success, Advanced Technology in Glass Repair, 8 Pages, admitted as prior art as of Mar. 4, 2010.

Exhibit C—BONDWand . . . The Light Source That Doesn't Leave You in the Dark, Electro-Lite Corporation, 2 Pages, admitted as prior art as of Mar. 4, 2010.

Exhibit D—3 Pages of pictures of a Novus UV Curing Lamp, admitted as prior art as of Mar. 4, 2010.

Exhibit E—Coolinnovations, 2.00"×2.00", G Type, Flared Pin Configuration, 1 Page, admitted as prior art as of Mar. 4, 2010.

Exhibit F—Norlux, HEX Optic (40 Die), SAP # 128743, 1 Page, admitted as prior art as of Mar. 4, 2010.

Exhibit G—Norlux, UV Hex (40 Die) 365 nm, SAP # 129905, 6 Pages, admitted as prior art as of Mar. 4, 2010.

Invitation to Pay Additional Fees with Partial International Search mailed Jul. 22, 2011.

International Search Report and Written Opinion mailed Nov. 29, 2011.

\* cited by examiner

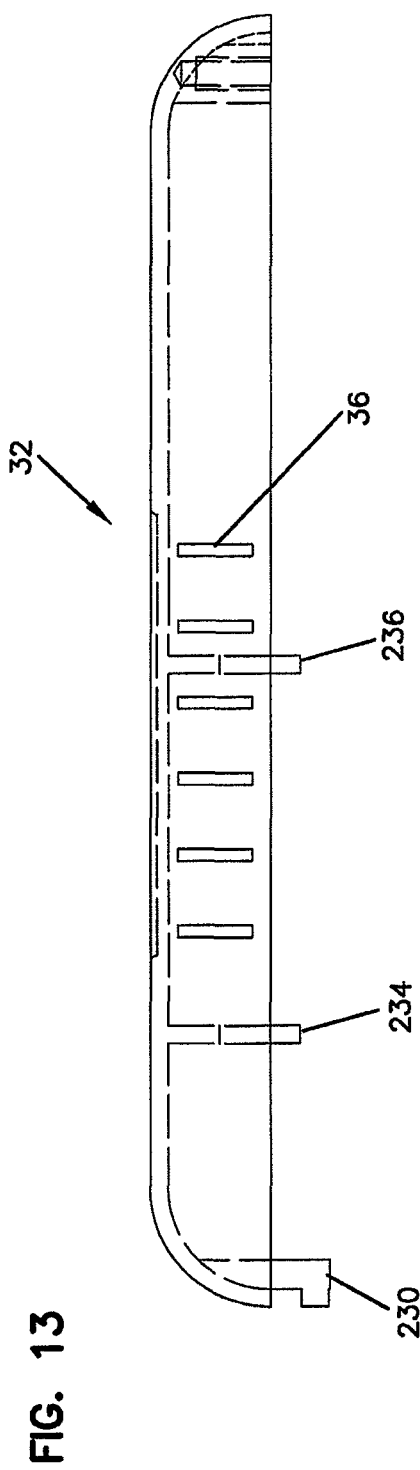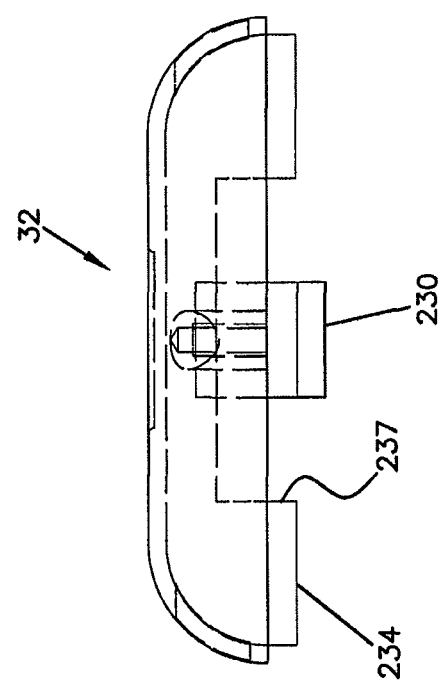

LED CURING LAMP AND METHOD

CROSS-REFERENCE TO RELATED APPLICATION

This application is a divisional of U.S. application Ser. No. 13/038,173, filed Mar. 1, 2011, which claims the benefit from U.S. Provisional Patent Application Ser. Nos. 61/310,465, filed Mar. 4, 2010, and 61/411,784, filed Nov. 9, 2010, the disclosures of which are hereby incorporated herein by reference.

FIELD OF THE INVENTION

The present invention relates to curing lamps for curing repair material used to repair cracks in windshields or other glass or plastic materials.

BACKGROUND OF THE INVENTION

When a windshield or other glass or plastic material becomes cracked, a resin or other repair material can be used to repair the crack. Various repair bridges or devices with resin injectors are known for applying repair resin to the crack including devices shown in U.S. Pat. Nos. 5,565,217; 5,776,506; 6,139,300 and 6,302,670.

Often the repair material needs to be cured with an ultraviolet (UV) light source. Lamps including a UV light source are known which are positioned adjacent to the windshield or other surface, close to the crack to cure the repair material positioned in the crack. An example lamp is shown in U.S. Pat. No. 7,131,752. A common wavelength for curing lamps is 365 nanometers.

There is a need for further improvements with respect to curing lamps.

SUMMARY OF THE INVENTION

The present invention includes a curing lamp apparatus for mounting to a work surface including a suction cup engageable with the work surface, and a base mounted to the suction cup. A lamp head extends from the base and includes a lamp element. The lamp element includes a first UV light source emitting UV light at a first wavelength, and a second UV light source emitting UV light at a second wavelength.

A further aspect of the present invention relates to a curing lamp apparatus for mounting to a work surface including a suction cup engageable with the work surface, and a base mounted to the suction cup. A lamp head extends from the base and includes a lamp element for emitting UV light. In one embodiment, a flexible neck connects the lamp head to the base. The flexible neck allows bending and rotation about the neck.

In a further aspect, the lamp head includes a heat sink. In one implementation, the heat sink includes a plate and projecting pins. A housing surrounds the heat sink.

In a still further aspect, the lamp element includes a substrate including a plurality of dies which include LED emitting structures. A reflector mounts to the substrate. A lens covers the reflector.

Another aspect of the present invention relates to a method of repairing a structure comprising applying resin to a crack on a first side of the structure to be repaired; and mounting a base of a lamp apparatus to a second side of the structure, wherein the second side is opposite to the first side. The method further comprises directing UV light from a lamp element connected to the base through the structure to cause curing of the resin in the crack.

BRIEF DESCRIPTION OF THE DRAWINGS

FIG. 13 is a side view of the top cover of the base.

FIG. 14 is an end view of the top cover of the base.

DETAILED DESCRIPTION OF THE PREFERRED EMBODIMENT

Figure 1:
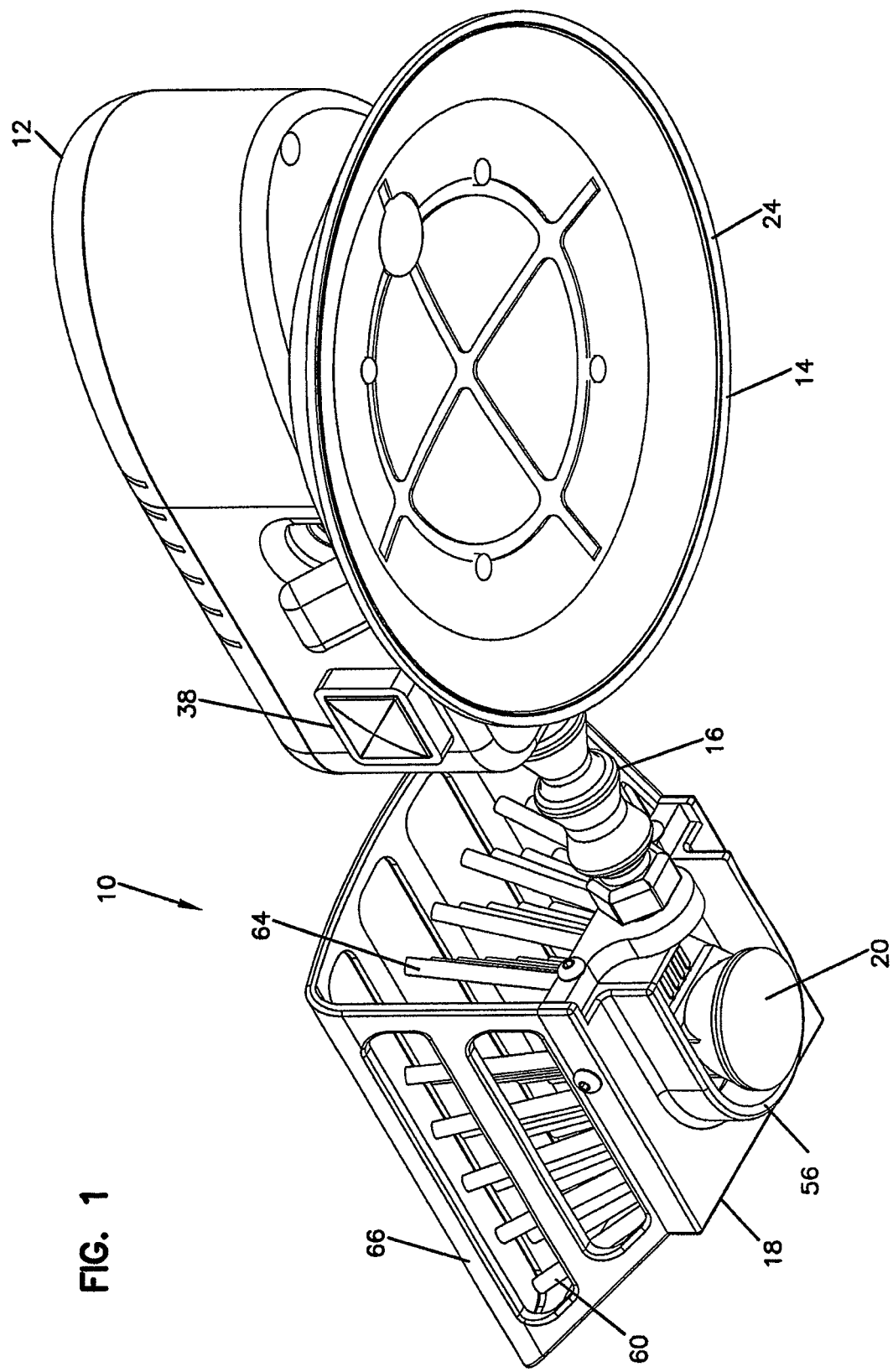
FIG. 1 is a first perspective view of a curing lamp in accordance with one embodiment of the present invention.
Figure 2:
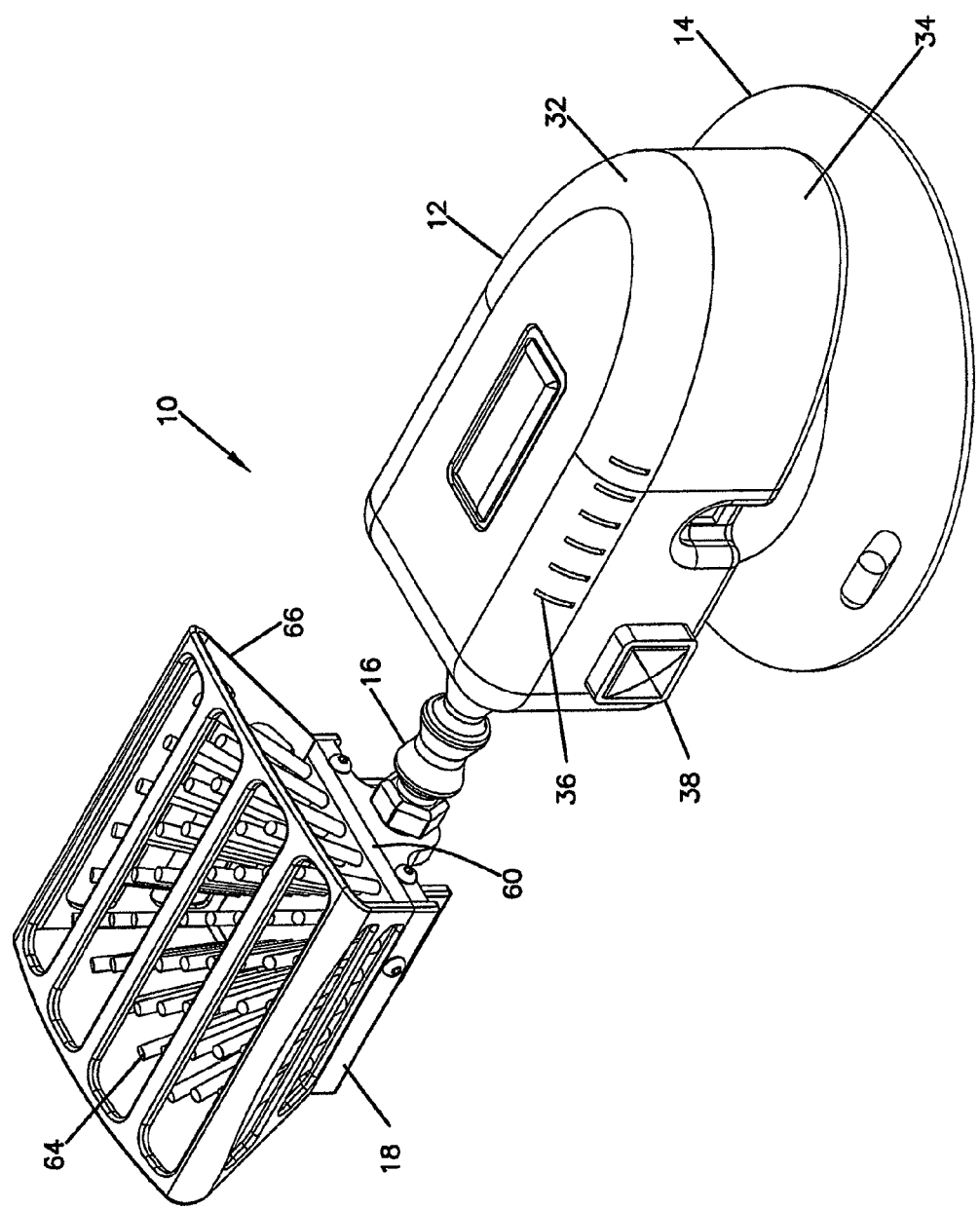
FIG. 2 is an opposite side perspective view of the curing lamp shown in FIG. 1.
Figure 3:
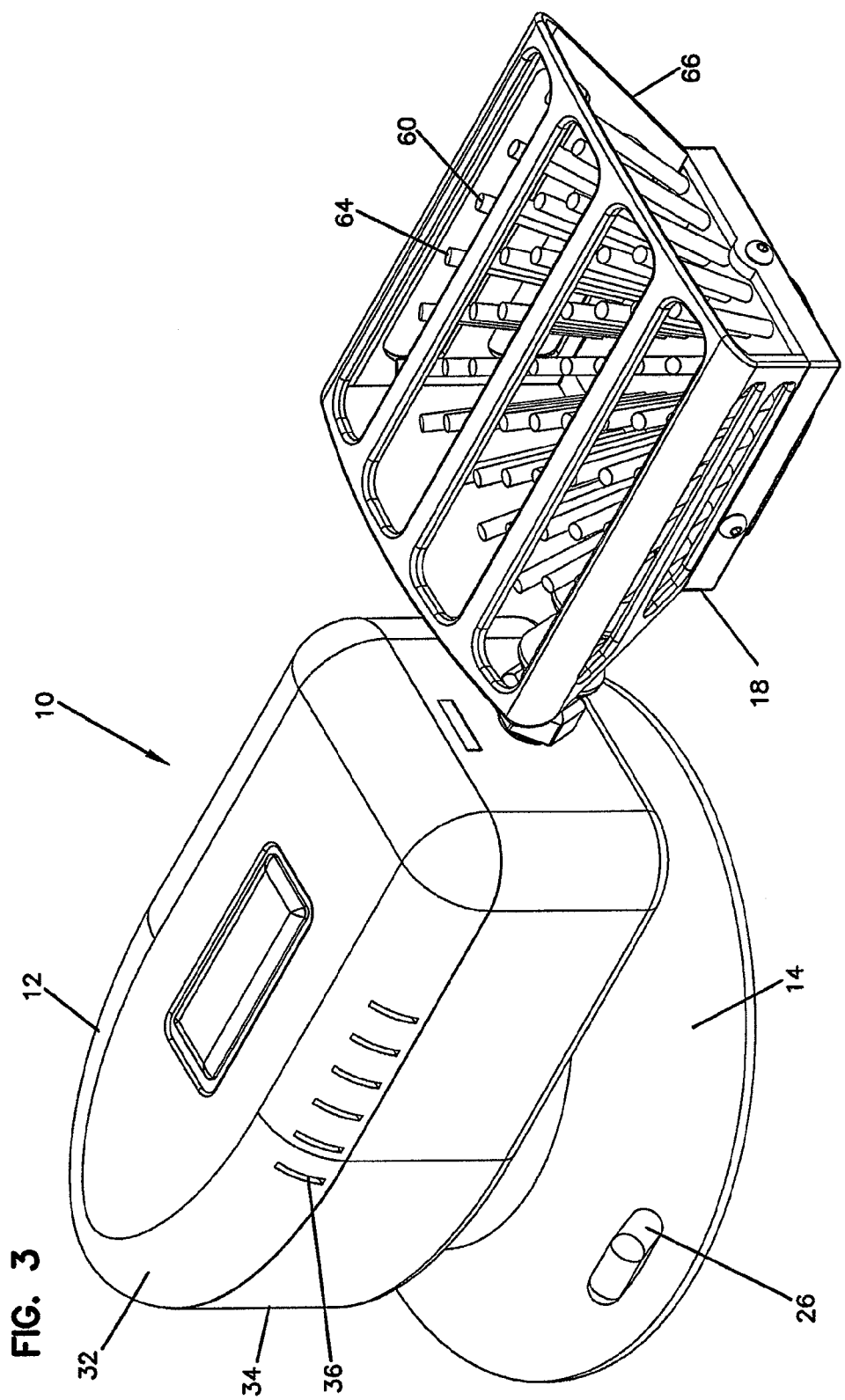
FIG. 3 is another opposite side perspective view of the curing lamp shown in FIG. 1.
Figure 4:
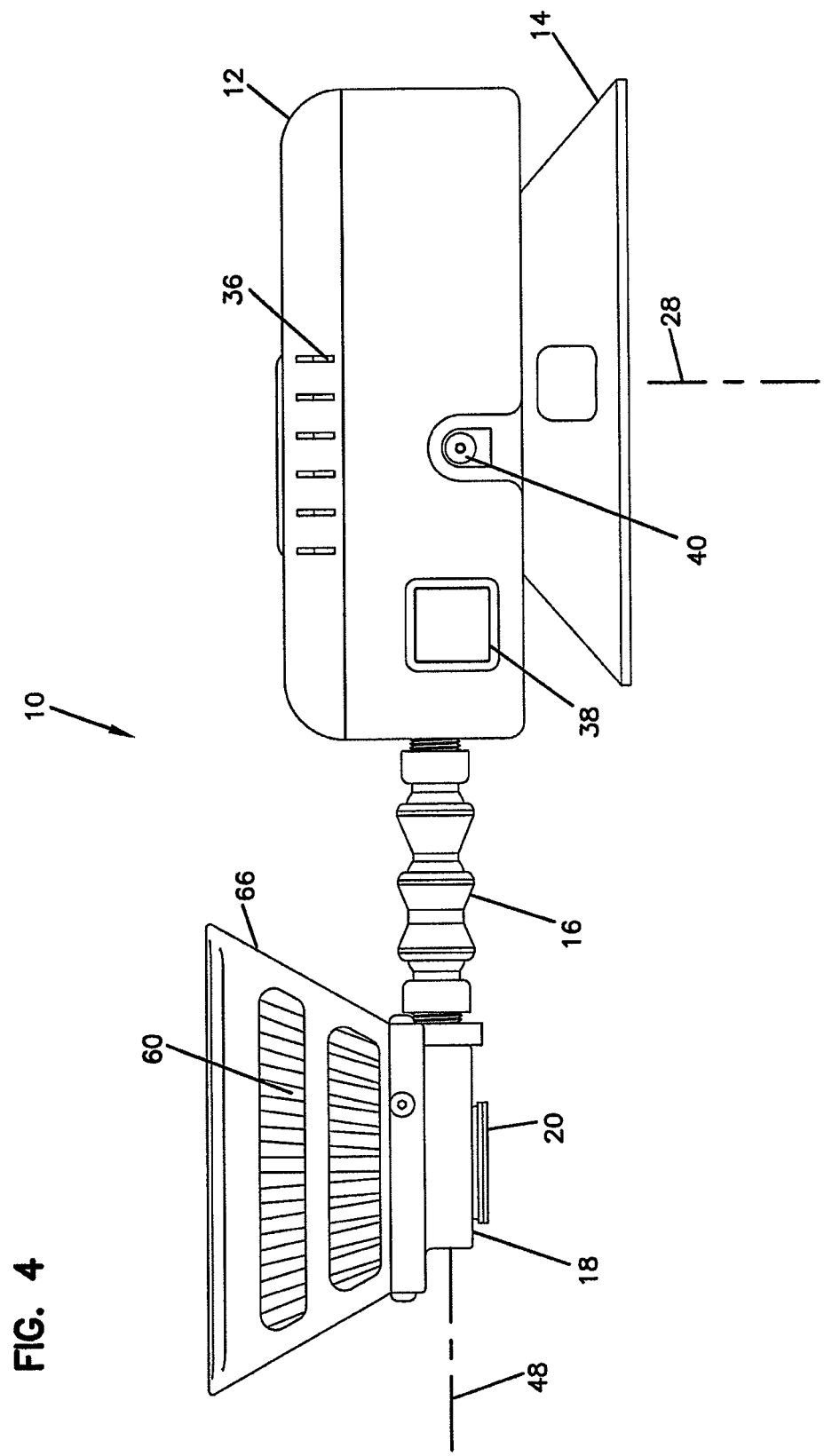
FIG. 4 is a side view of the curing lamp of FIG. 1.
Figure 5:
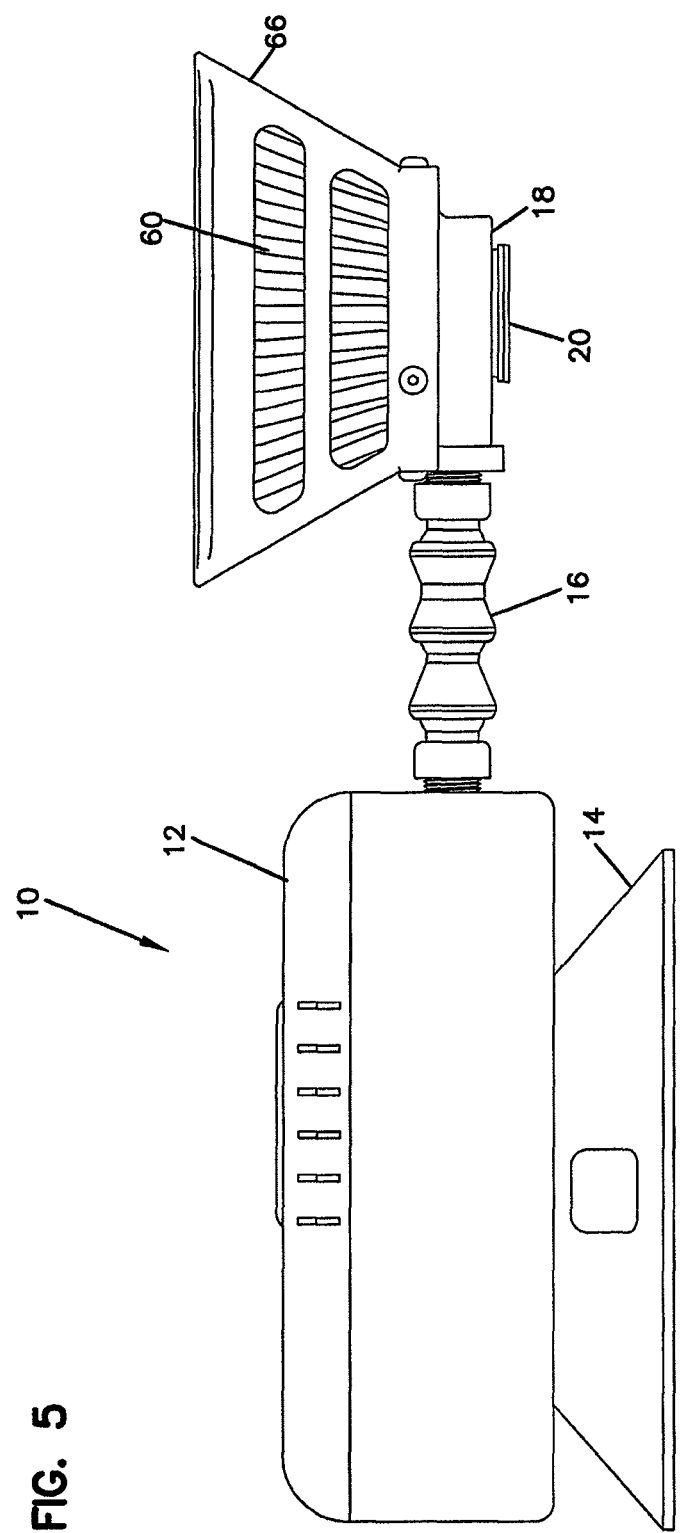
FIG. 5 is an opposite side view of the curing lamp of FIG. 4.
Figure 6:
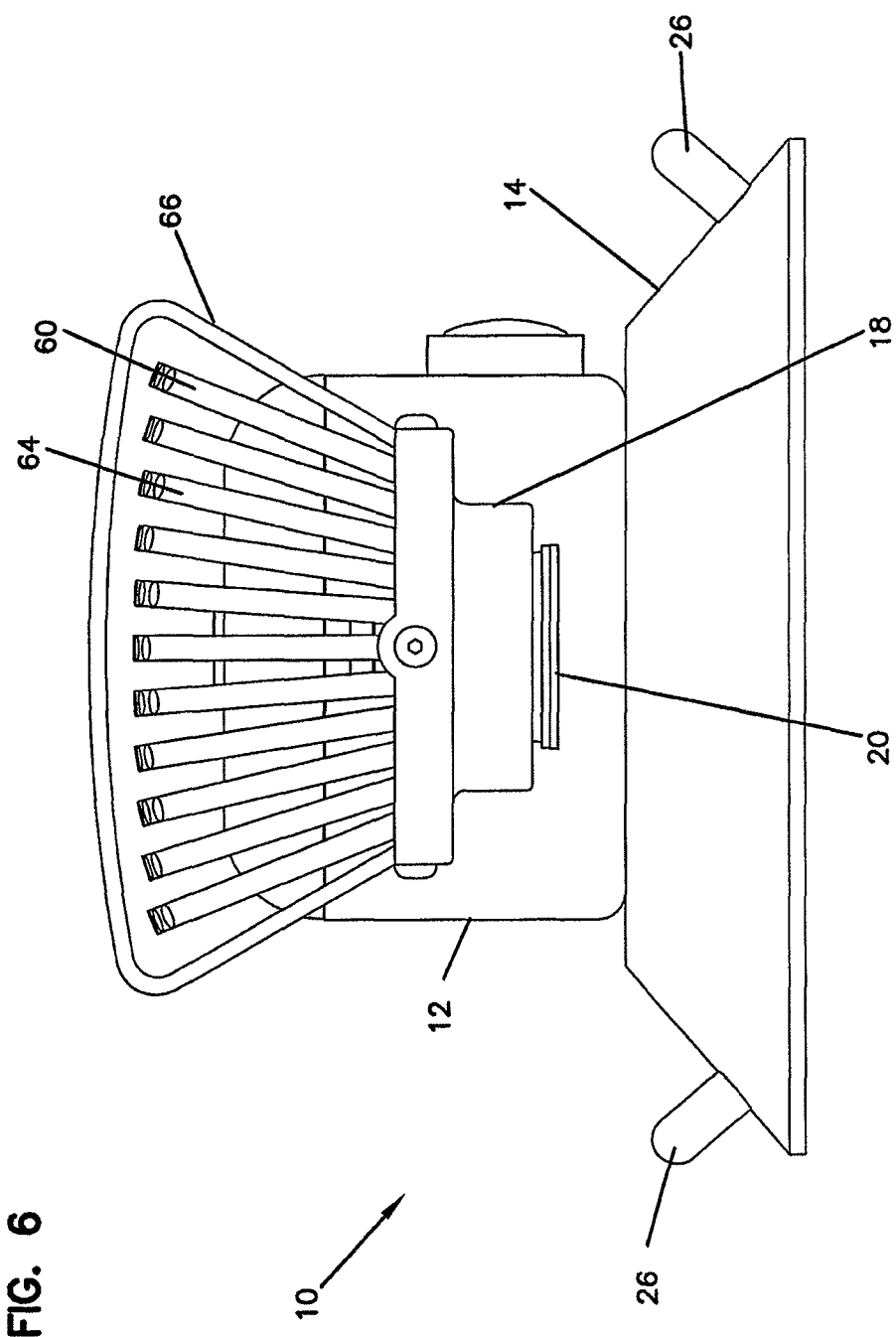
FIG. 6 is an end view of the curing lamp of FIG. 4.
Figure 7:
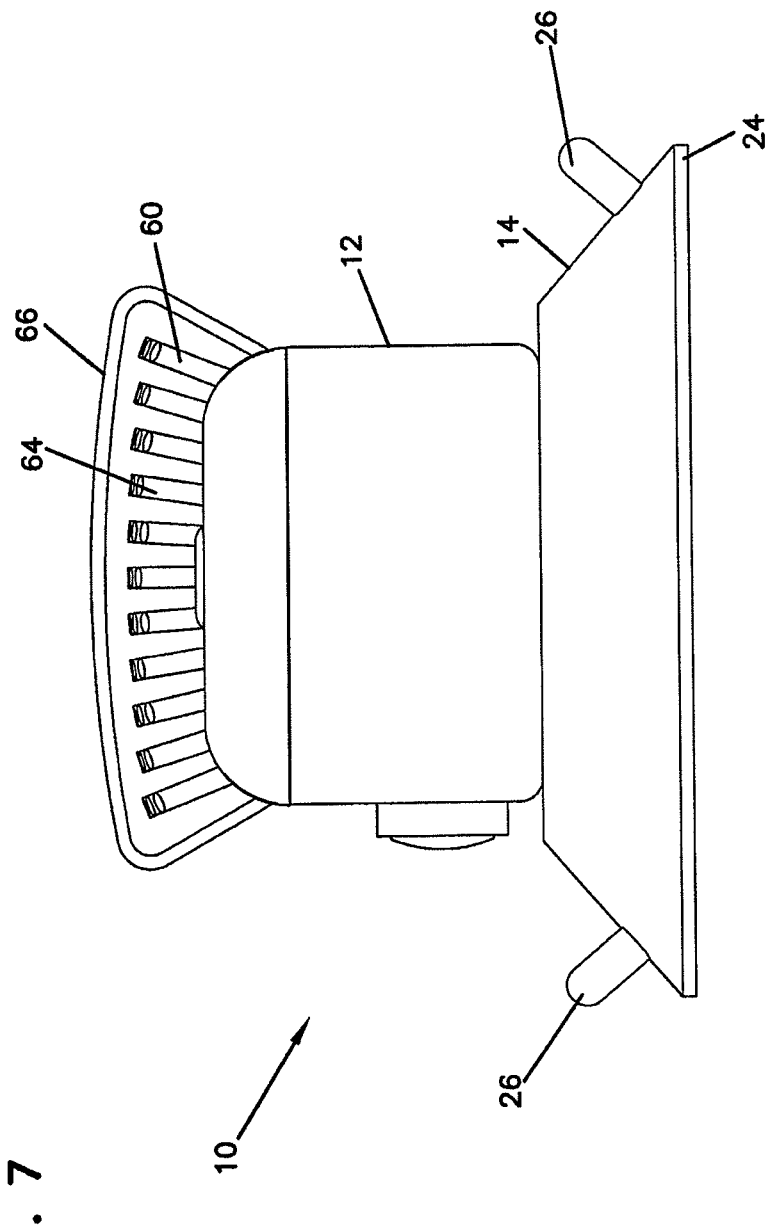
FIG. 7 is an opposite end view of the curing lamp of FIG. 6.
Figure 8:
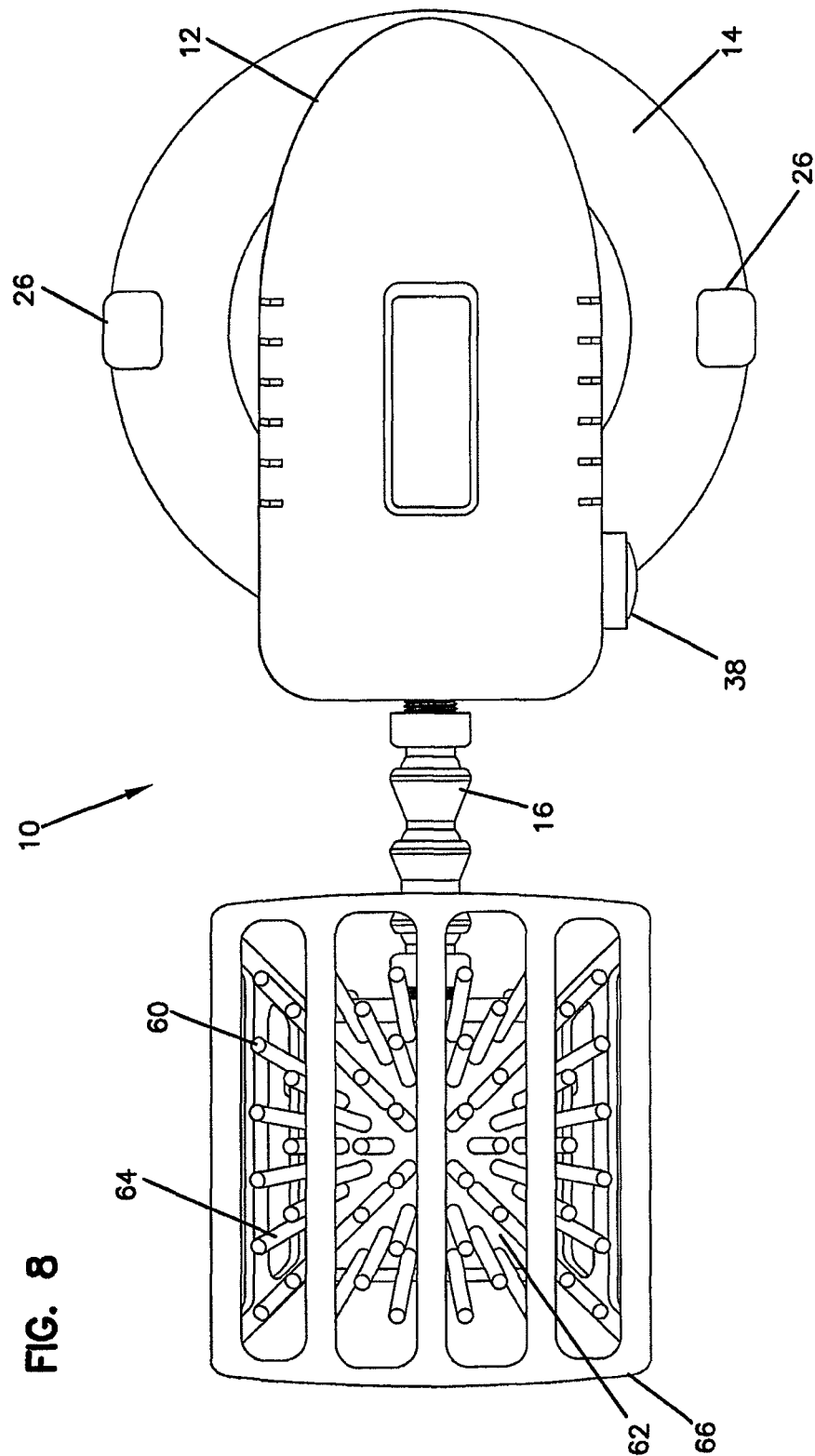
FIG. 8 is a top view of the curing lamp of FIG. 4.
Figure 9:
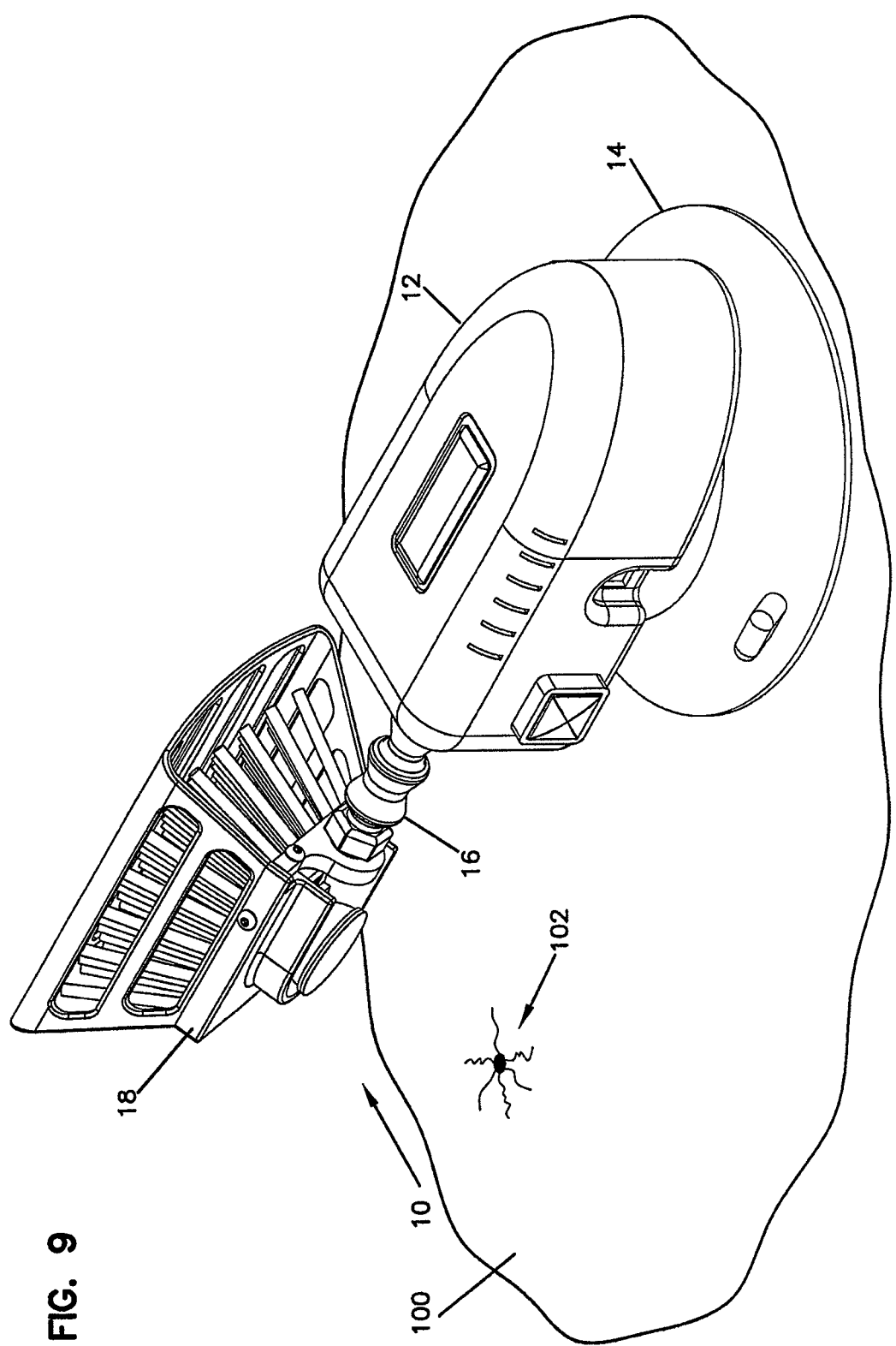
FIG. 9 is another perspective view of the curing lamp of FIG. 1, showing the lamp head rotated relative to the base about the neck, and showing the curing lamp mounted to a windshield being repaired.
Figure 10:
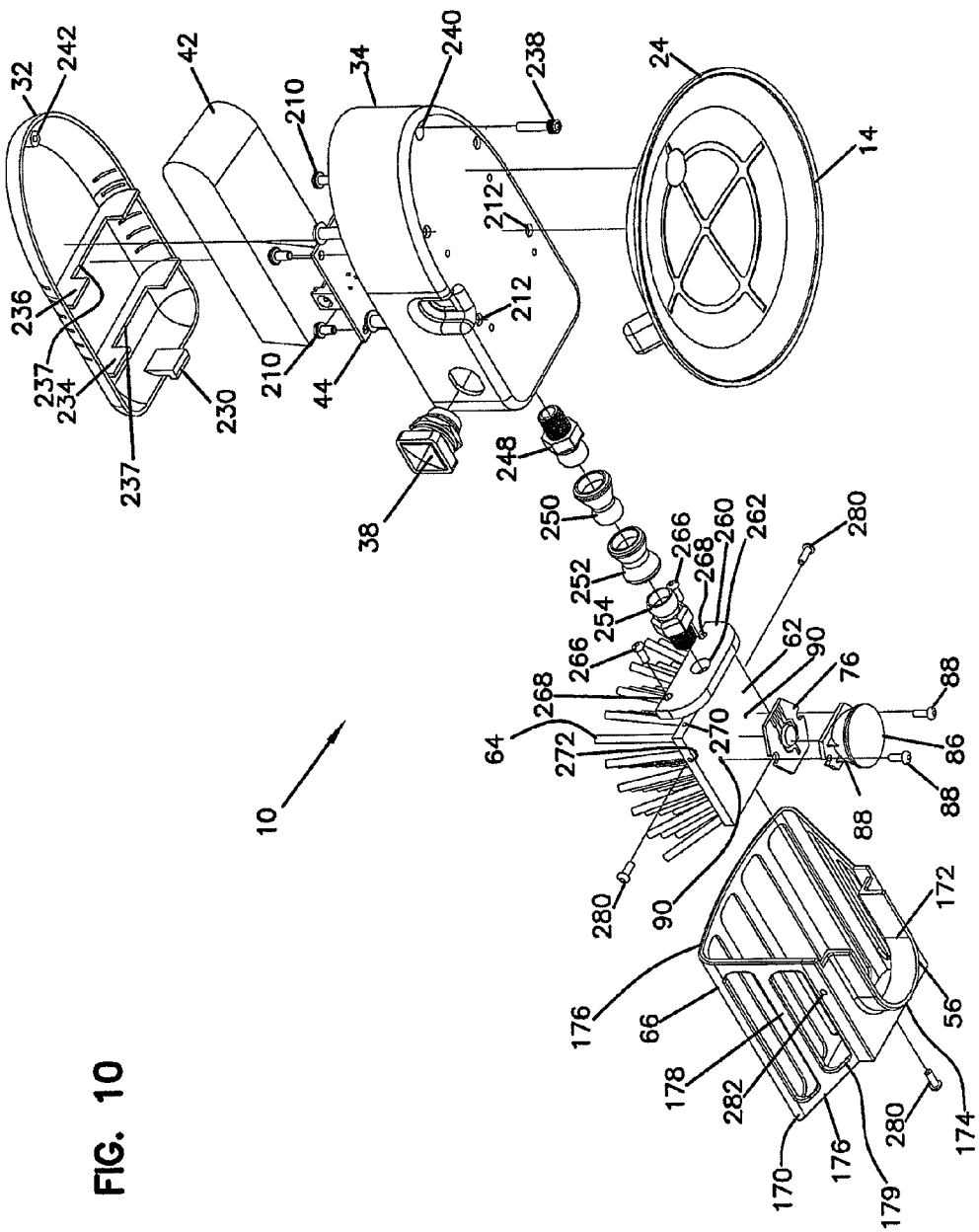
FIG. 10 is an exploded bottom perspective view of the curing lamp of FIG. 1.
Figure 11:
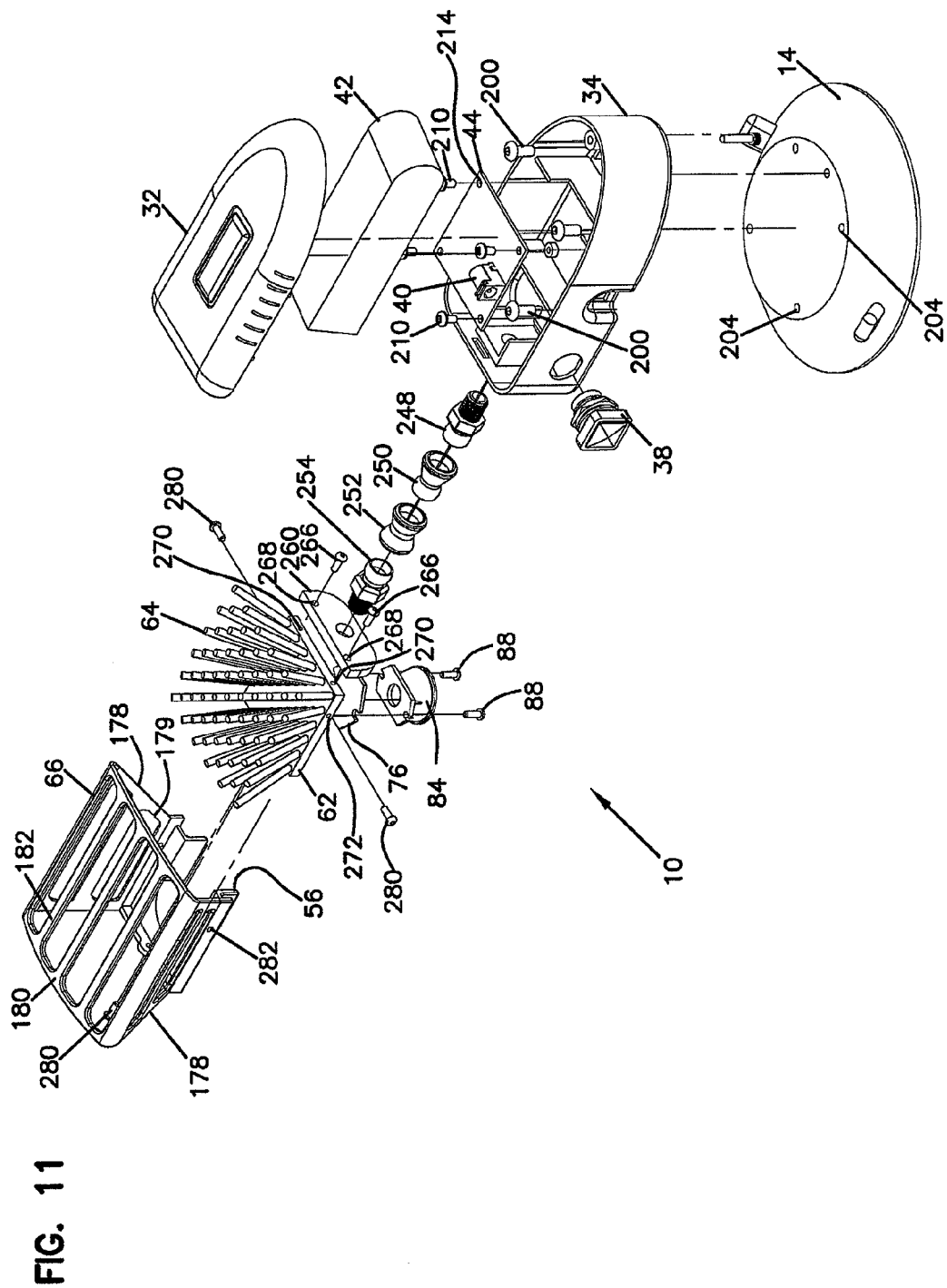
FIG. 11 is an exploded top perspective view of the curing lamp of FIG. 1.
Figure 12:
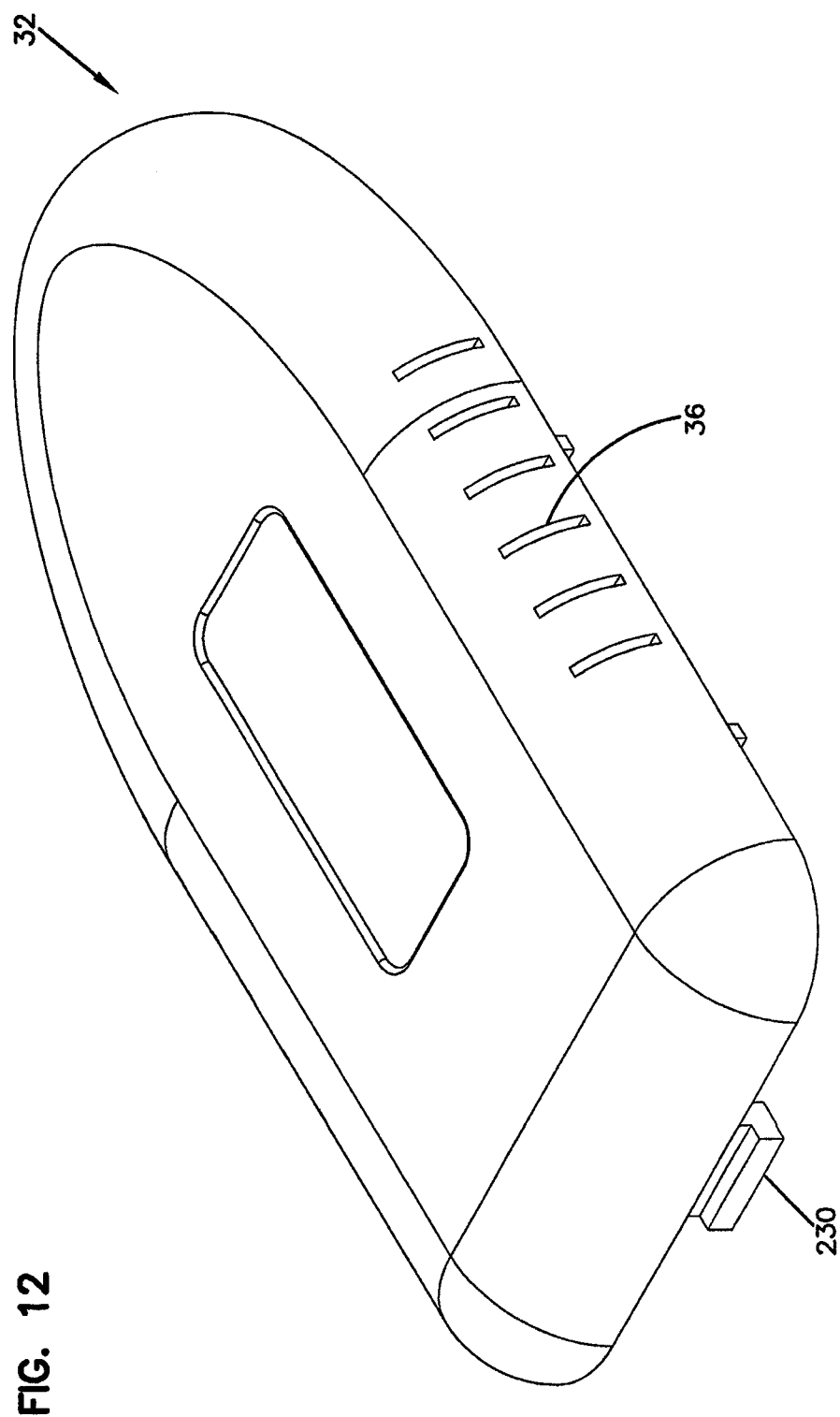
FIG. 12 is a top perspective view of the top cover of the base.
Figure 15:
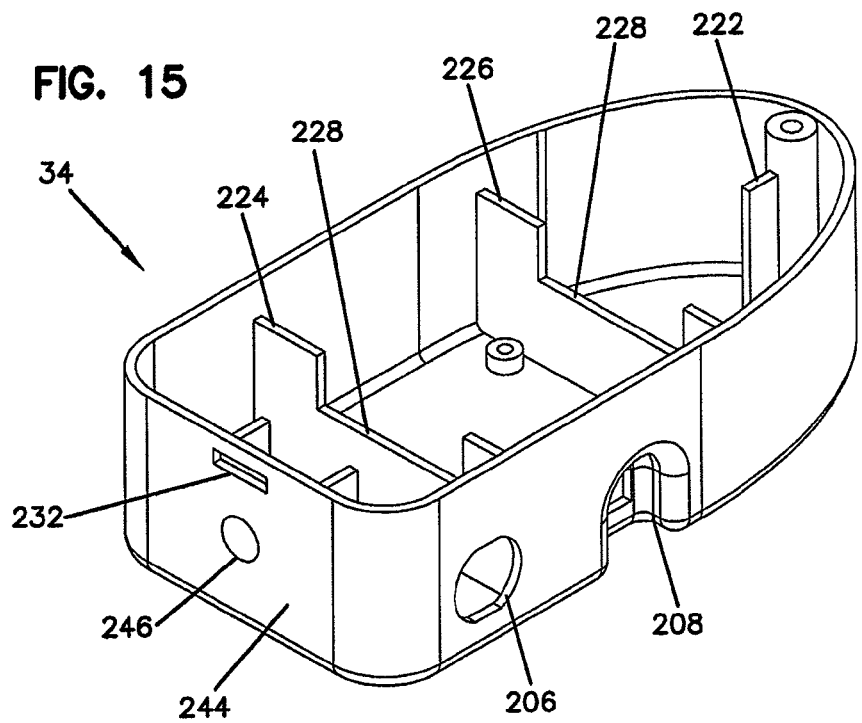
FIG. 15 is a top perspective view of the bottom portion of the base.
Figure 16:
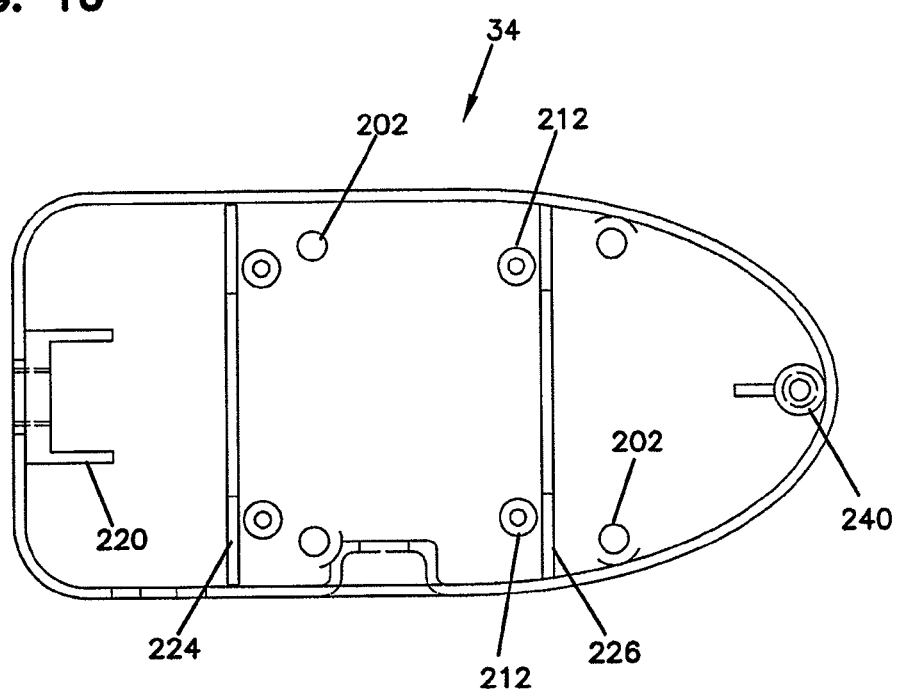
FIG. 16 is a top view of the bottom portion of the base.
Figure 17:
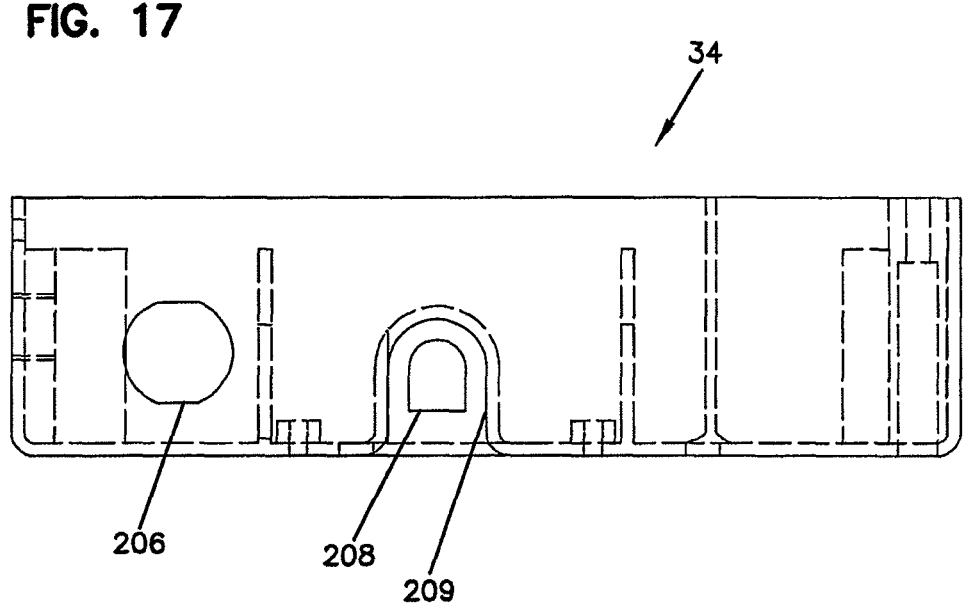
FIG. 17 is a side view of the bottom portion of the base.
Figure 18:
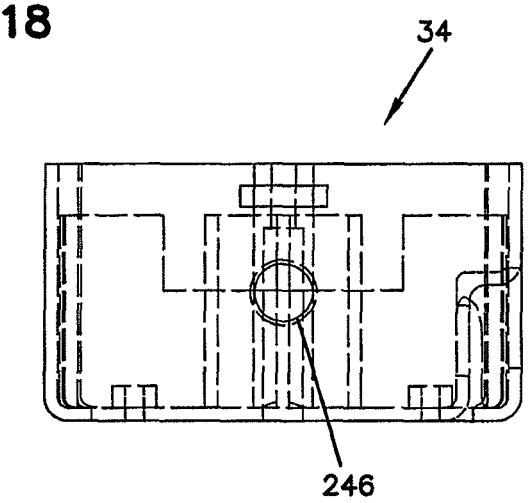
FIG. 18 is an end view of the bottom portion of the base.
Figure 19:
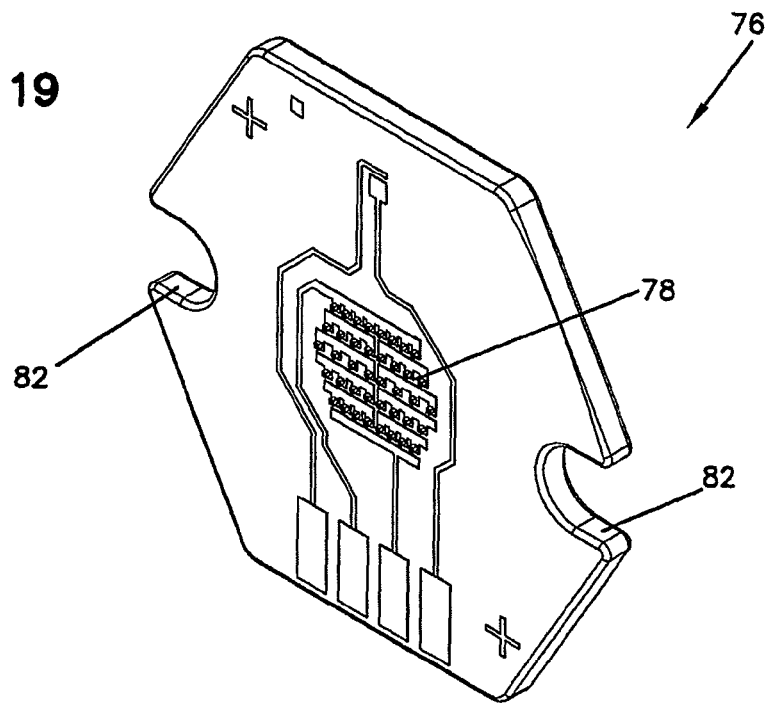
FIG. 19 is a perspective view of the lamp substrate.
Figure 20:
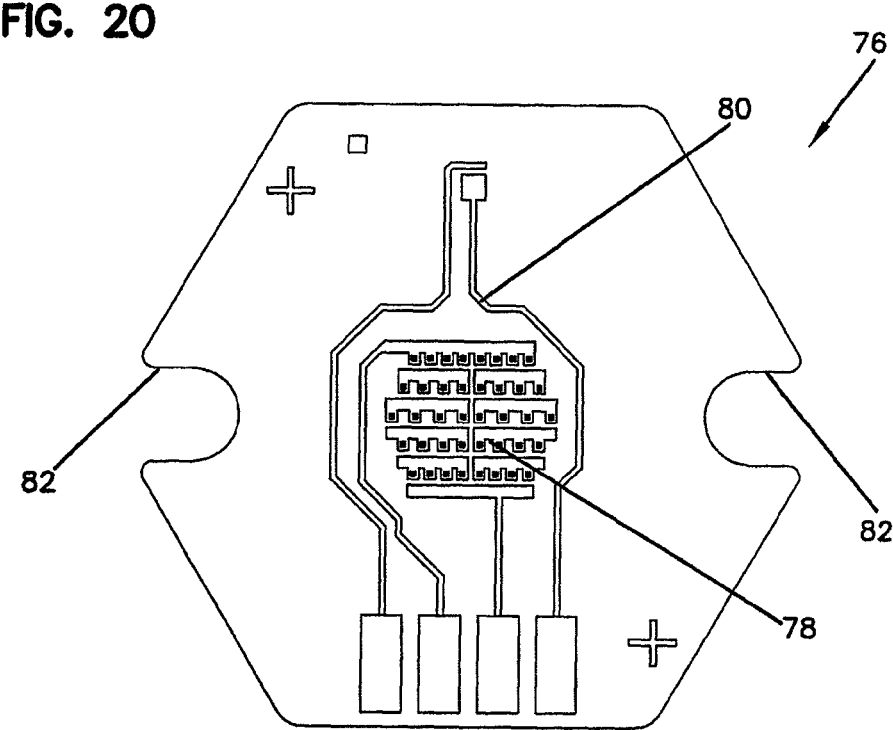
FIG. 20 is a front view of the lamp substrate of FIG. 19.
Figure 21:
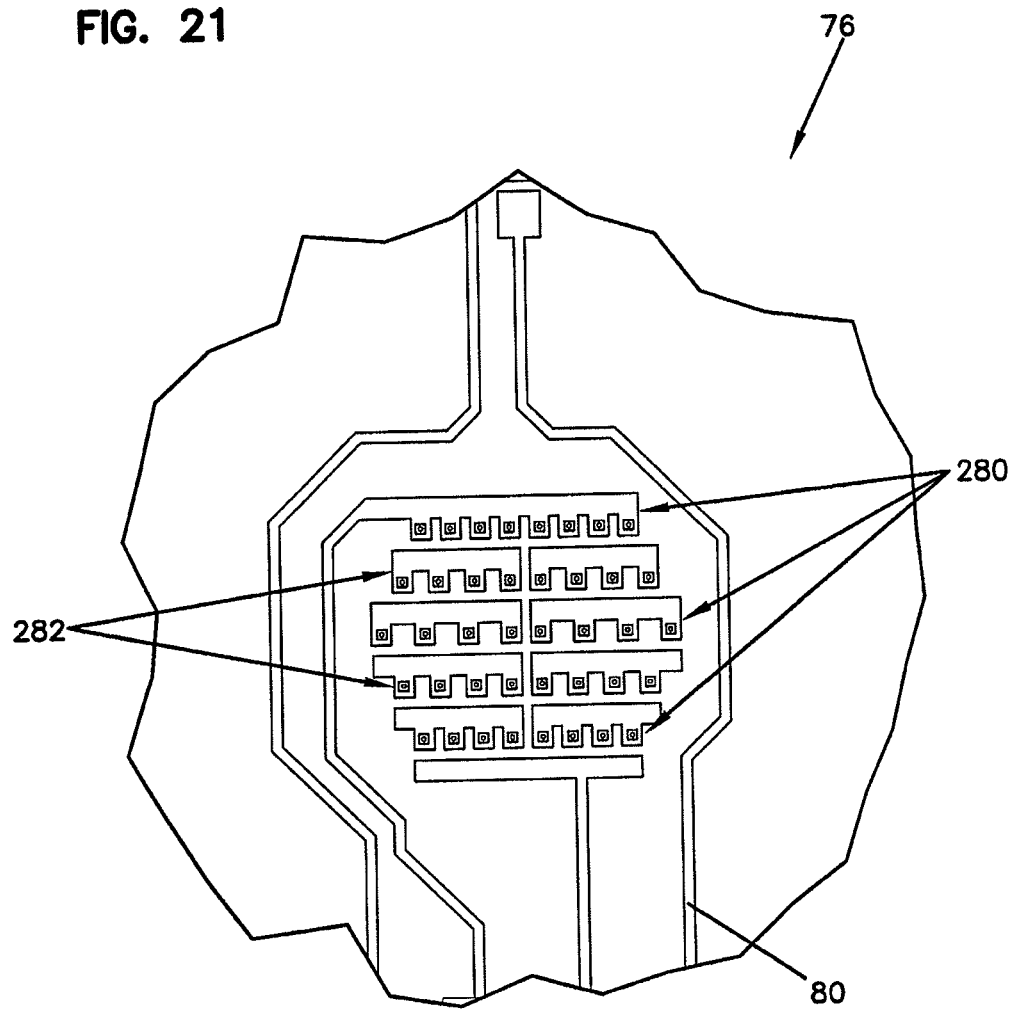
FIG. 21 is an enlarged view of a portion of the lamp substrate of FIG. 20.

Referring now to FIGS. 1-21, a lamp apparatus 10 for curing repair resin in accordance with one preferred embodiment of the present invention is shown. Lamp apparatus 10 includes a base 12 including at least one suction cup 14 used for mounting lamp apparatus 10 to a windshield or other surface to be repaired. Extending from base 12 is a neck 16 terminating in a lamp head 18. Lamp head 18 includes a lamp element 20 for emitting UV (ultraviolet) light on the windshield. The UV light is used to cure repair material positioned in a crack within the windshield. FIG. 9 shows the lamp apparatus 10 mounted on a windshield 100 adjacent a break 102.

Suction cup 14 secures base 12 to the windshield as desired by the user. Suction cup 14 defines a longitudinal axis 28. Suction cup 14 includes a bottom 24 which creates a sealing surface with the windshield. Knobs 26 allow for opposite sides of suction cup 14 to be pulled toward base 12. Such action is useful to mount suction cup 14 to the windshield. Such action is also useful to remove suction cup 14 from the windshield.

Base 12 includes a top cover 32 and a bottom portion 34 which form an enclosed housing. Airflow slots 36 are provided within base 12. Base 12 includes the control circuitry for lamp apparatus 10. A switch 38 allows for user control from an exterior of base 12. Base 12 also includes a power connector 40 for connecting to an external power supply, or a battery charger. Disposed within base 12 is a rechargeable battery 42. A PCB 44 with the control circuitry is also contained within base 12. Conductors extend from PCB 44 through neck 16 to lamp head 18 for controlling lamp element 20.

Neck 16 allows for relative movement between base 12 and lamp head 18. In the illustrated embodiment, neck 16 can be rotated about longitudinal axis 48. Neck 16 can also be bent relative to axis 48. With such flexibility, lamp head 18 can be placed into a variety of positions relative to base 12. Compare FIGS. 2 and 9 which show rotation of lamp head 18 relative to base 12. In one embodiment, neck 16 includes Loc-Line® fittings which allow for rotation of head 18, or bending movement, or both.

Lamp head 18 includes a housing 56 which holds lamp element 20. Lamp head 18 also includes a heat removal device, such as a heat sink 60, for use in cooling lamp element 20. Heat sink 60 includes a base 62 and projecting pins or rods 64. A heat sink housing 66 surrounds base 62 and rods 64 to protect from damage, and to protect the user from any sharp edges. Heat sink housing 66 defines a cage around rods 64 to protect the heat sink and allow for airflow to contact the heat sink to promote cooling.

Lamp element 20 includes a substrate 76 or PCB 76 which includes a plurality of dies 78 which emit the desired UV light. The substrate 76 includes tracings 80. Side notches 82 allow for substrate 76 to mount together with heat sink 60 with fasteners 88 into sockets 90 in heat sink base 62. A reflector 84 concentrates the light, and a protective lens 86 covers reflector 84.

An array of dies 78 is provided on substrate 76. (See FIG. 21). Each die emits light at a certain wavelength. In one embodiment, an array of five rows of eight dies are provided. Three rows 280 emit light at 365 nanometers. Two rows 282 emit light at 395 nanometers. In the example embodiment, the rows alternate. In other embodiments, all of the dies 78 emit UV light at the same wavelength.

Figure 22:
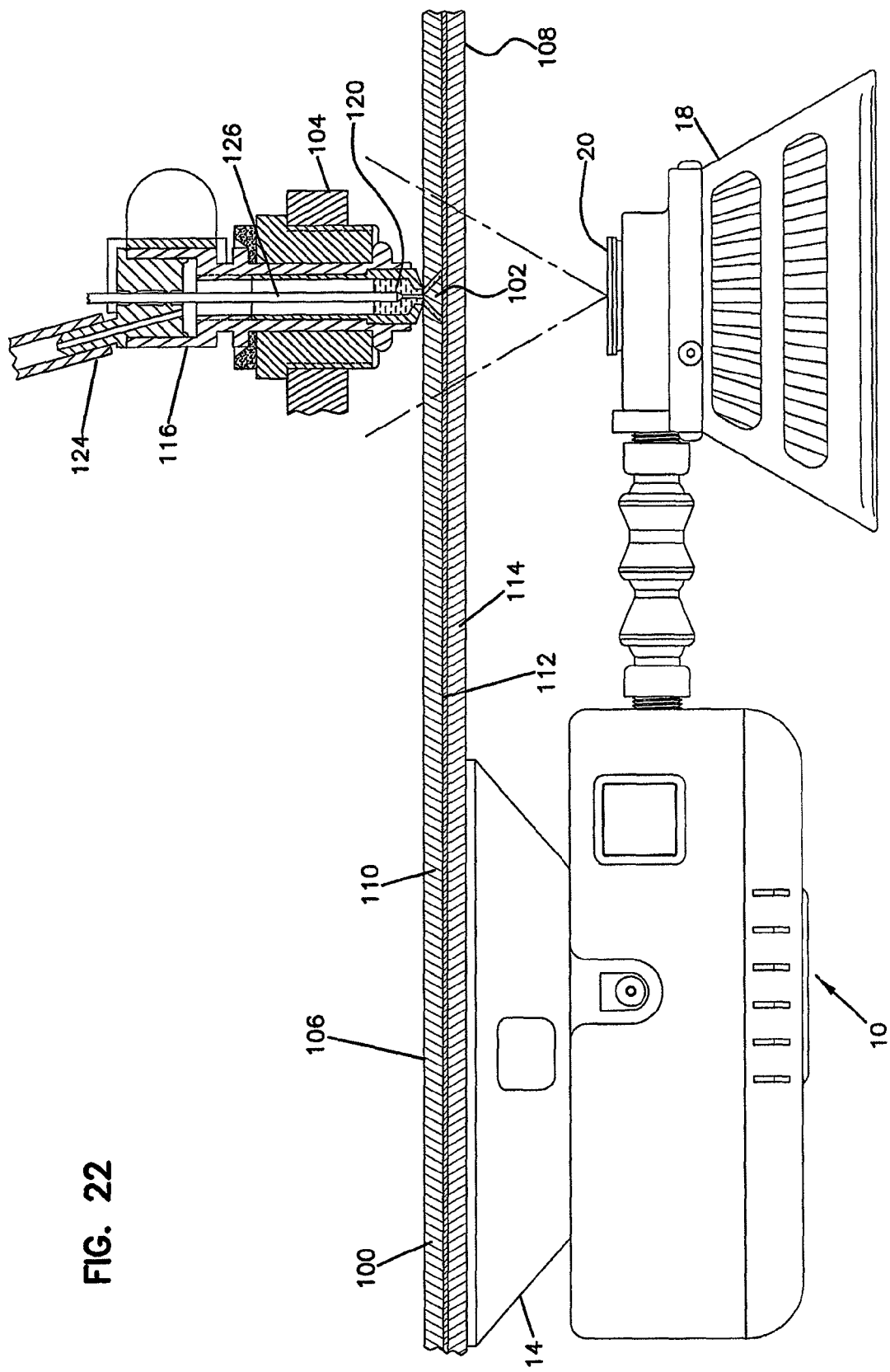
FIG. 22 is an example use of the curing lamp on a windshield being repaired.
Figure 23:
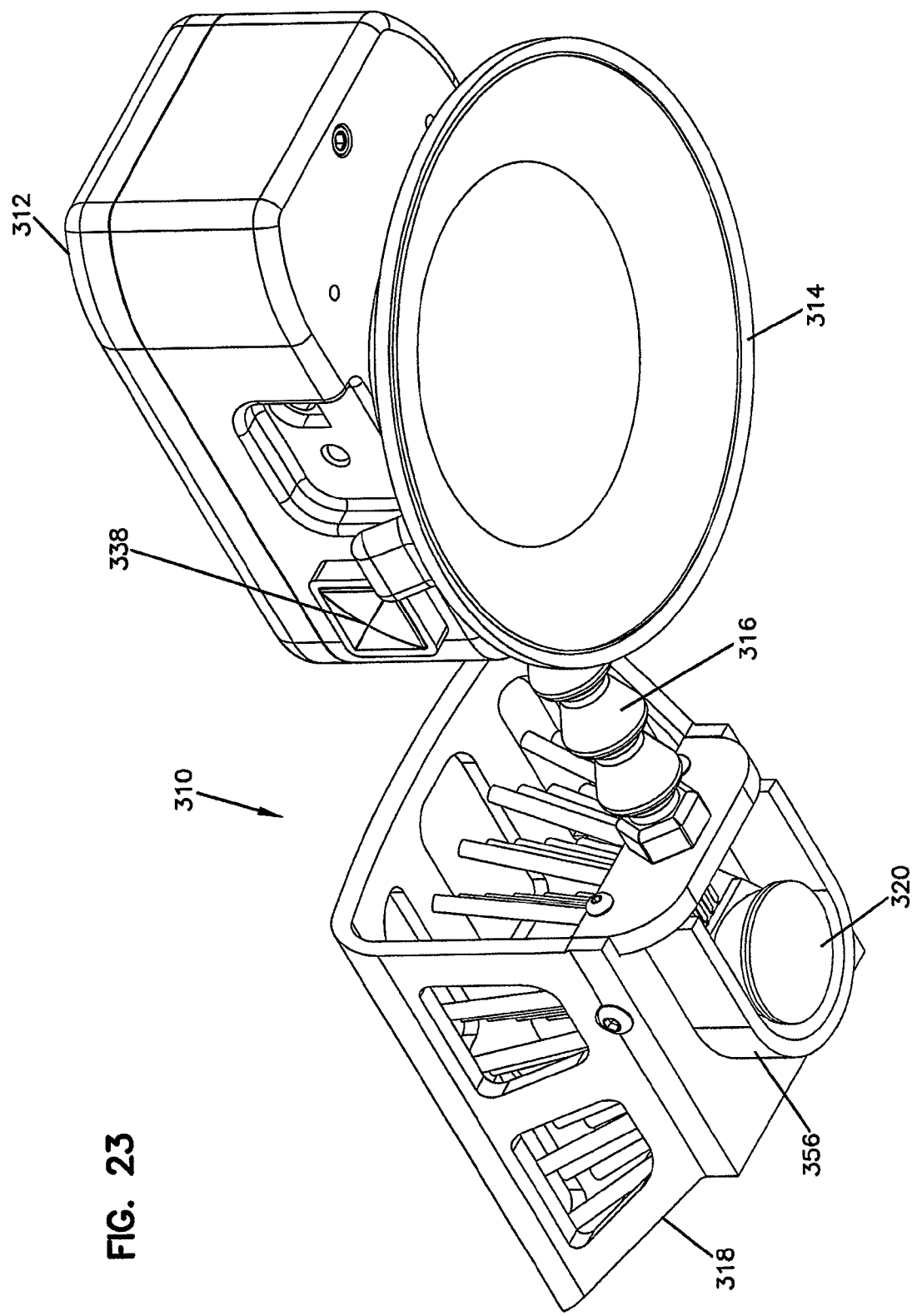
FIG. 23 is a first perspective view of another embodiment of a curing lamp in accordance with the present invention.
Figure 24:
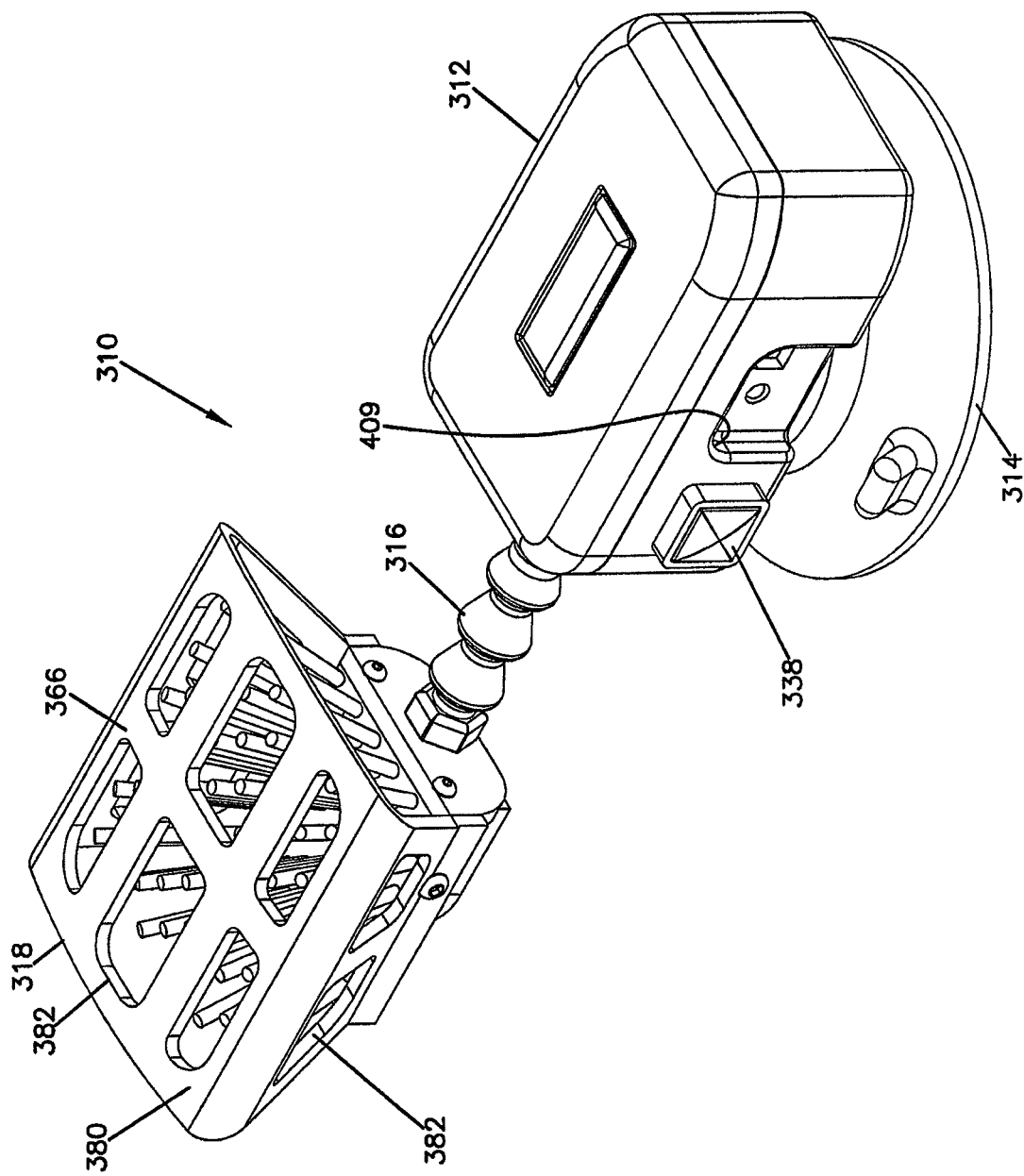
FIG. 24 is an opposite side perspective view of the curing lamp shown in FIG. 23.
Figure 25:
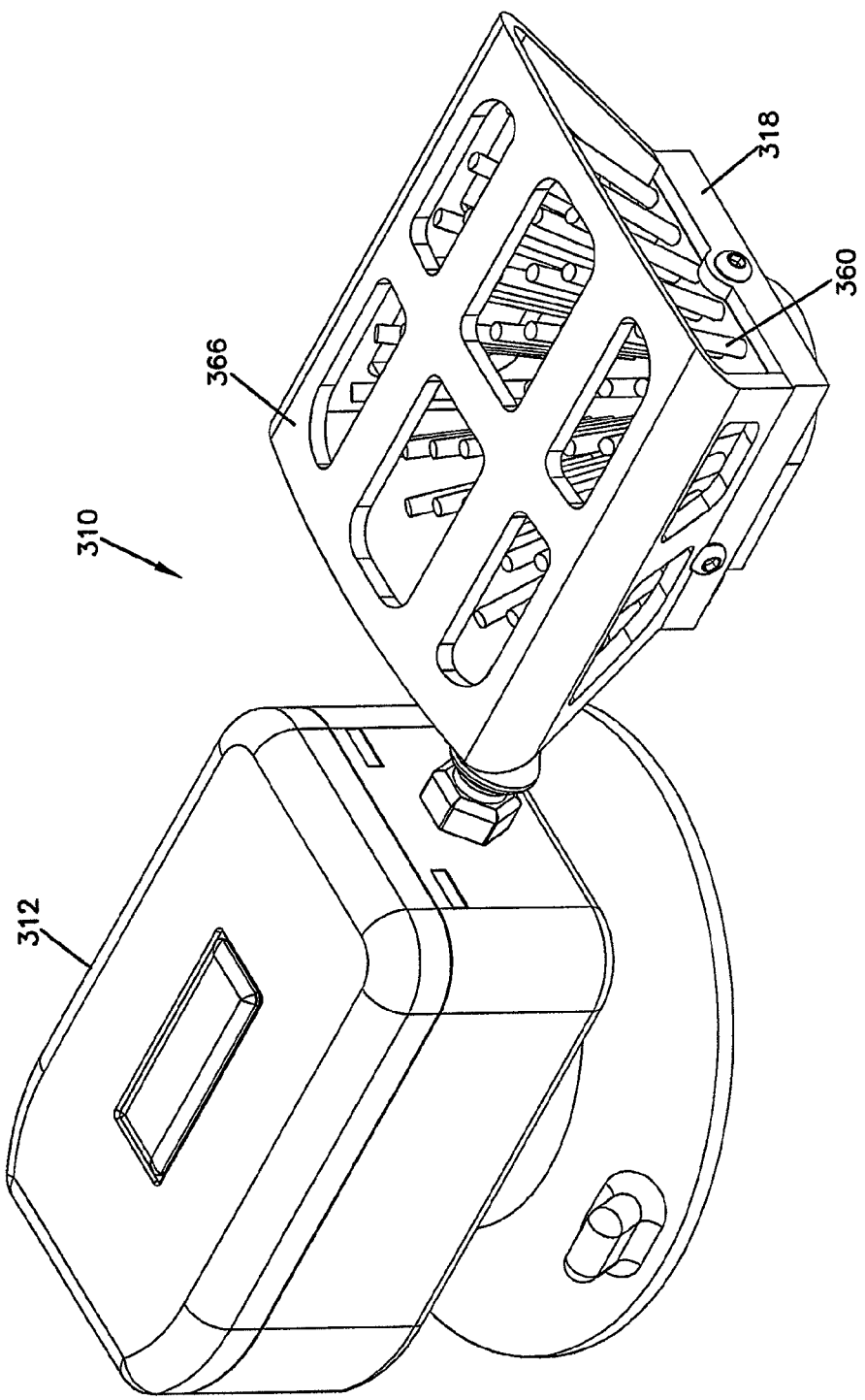
FIG. 25 is another opposite side perspective view of the curing lamp shown in FIG. 23.
Figure 26:
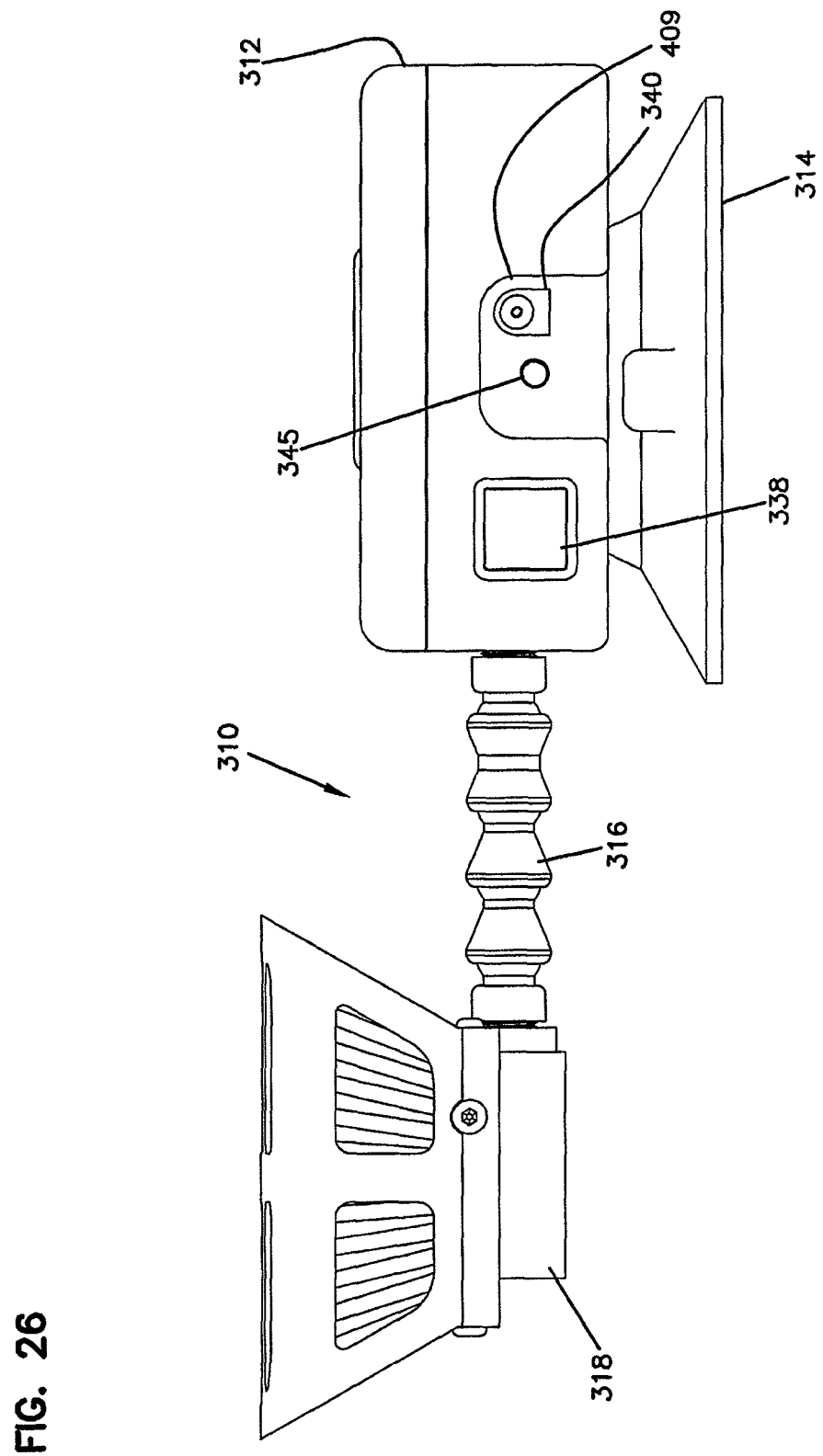
FIG. 26 is a side view of the curing lamp of FIG. 23.
Figure 27:
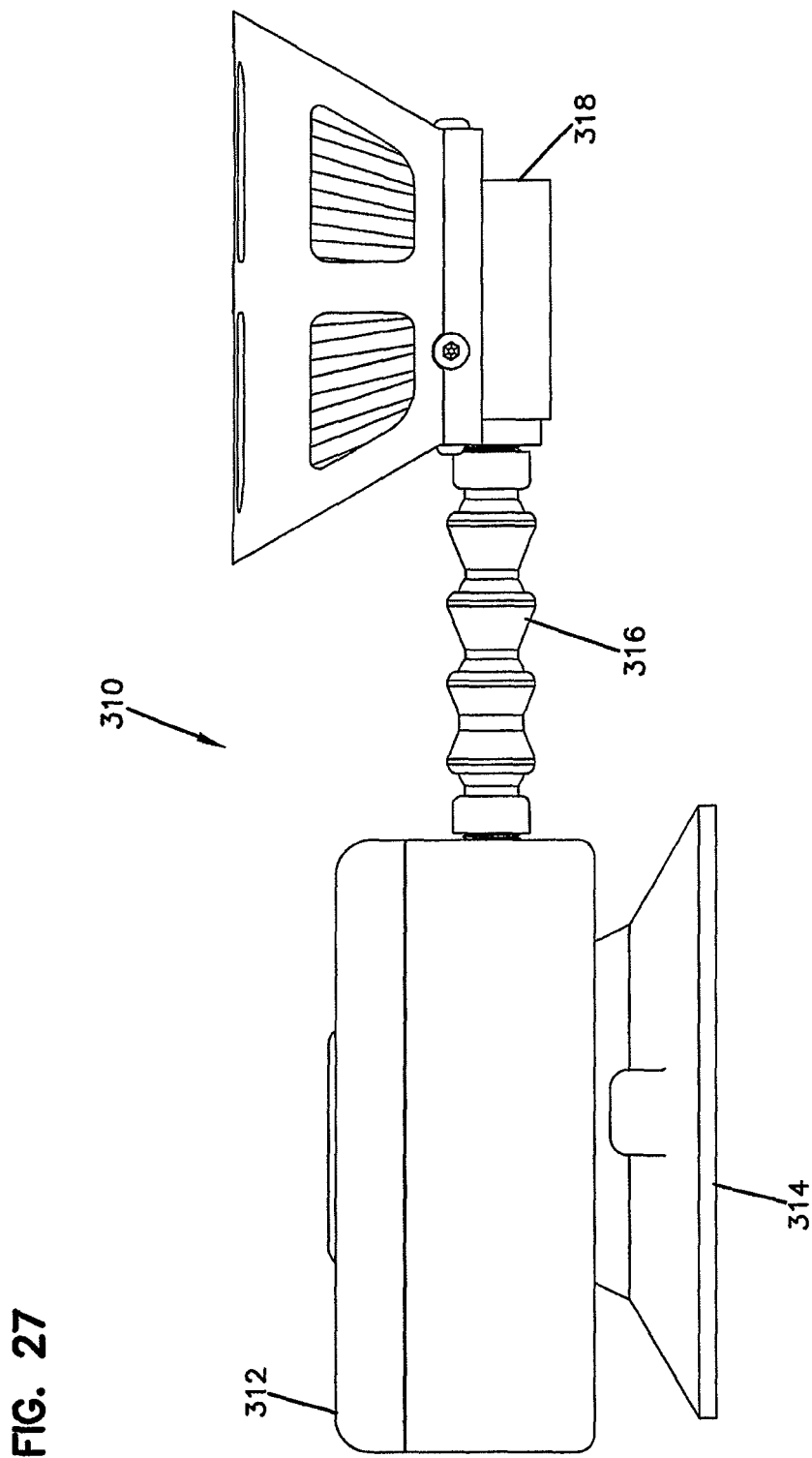
FIG. 27 is an opposite side view of the curing lamp of FIG. 26.
Figure 28:
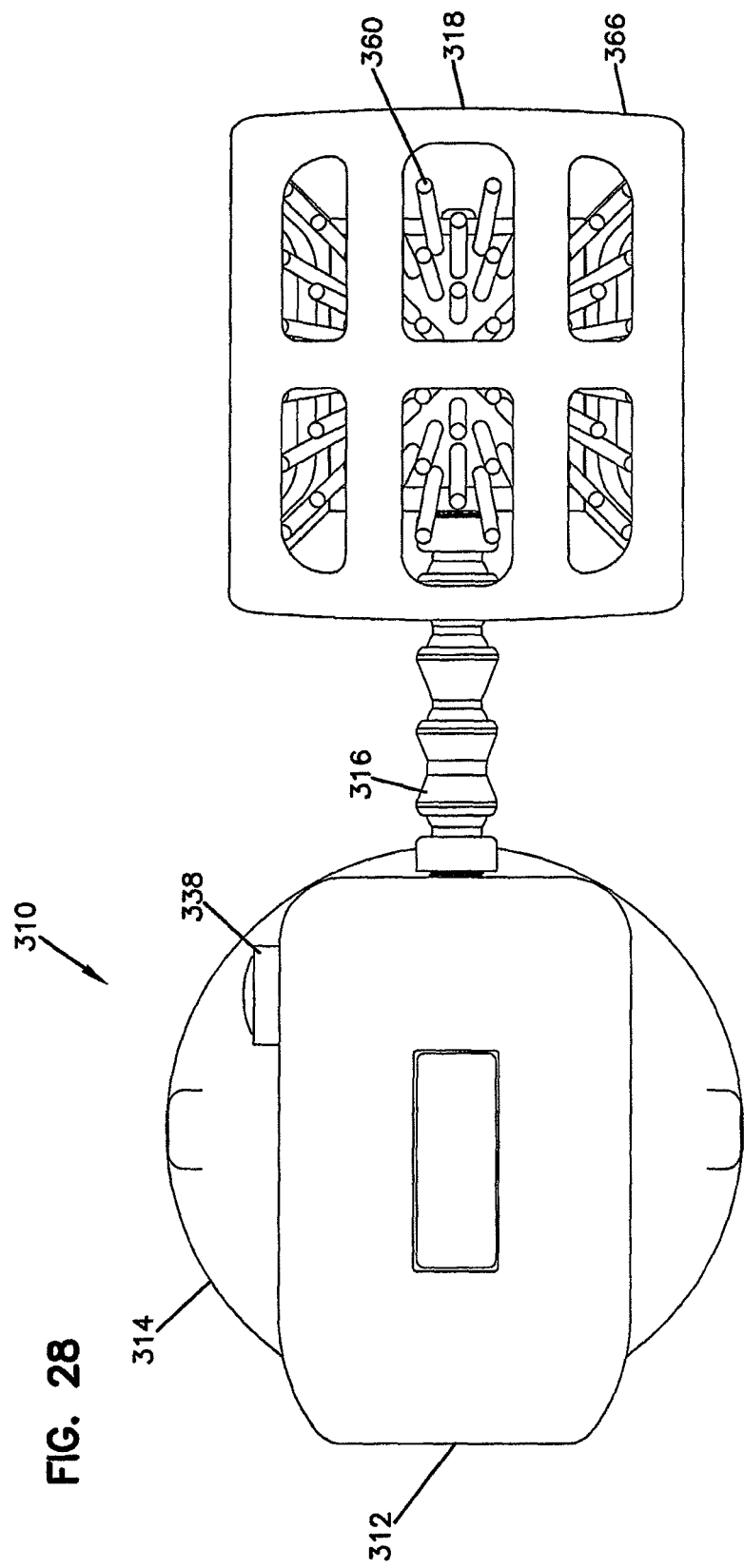
FIG. 28 is a top view of the curing lamp of FIG. 23.
Figure 29:
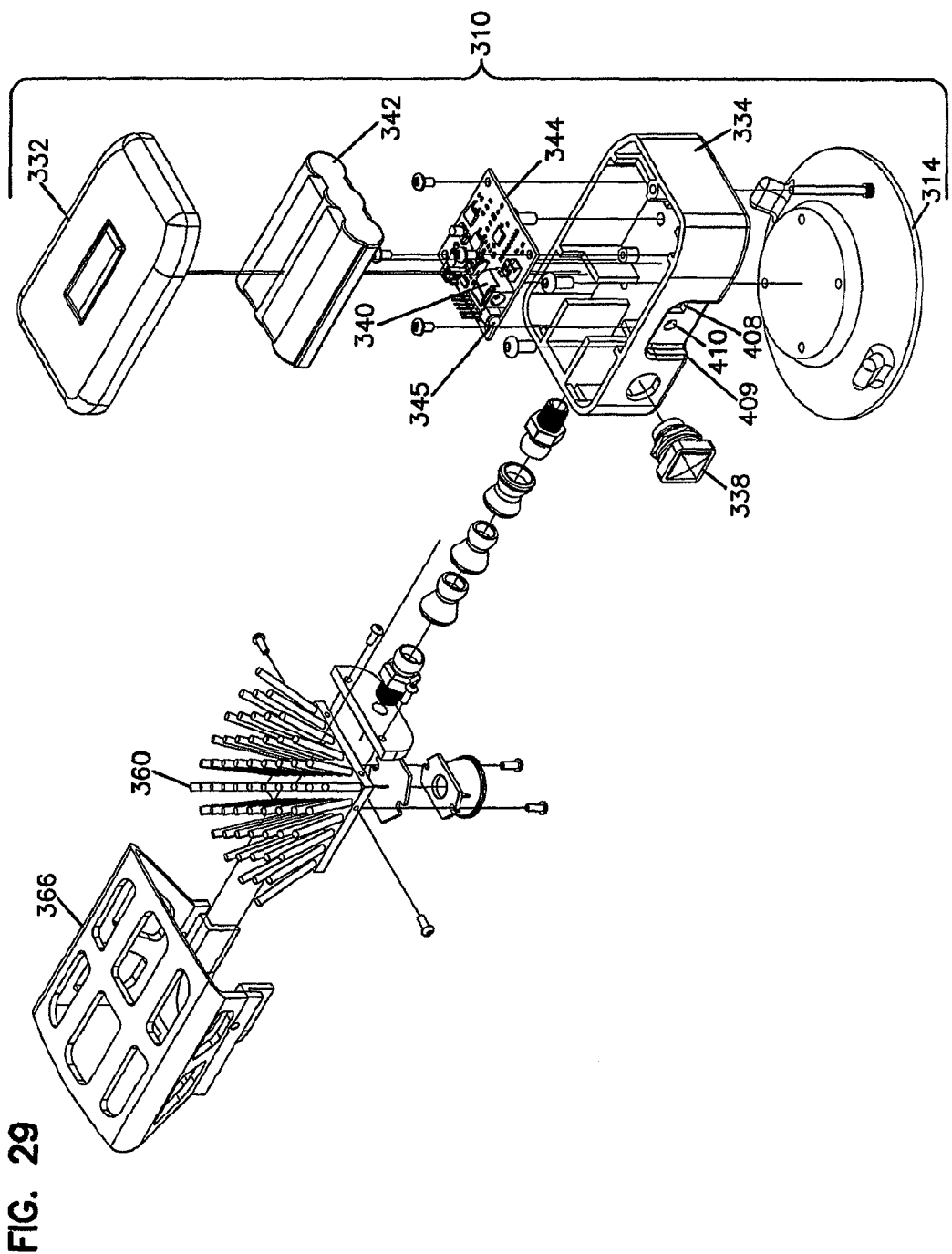
FIG. 29 is an exploded top perspective view of the curing lamp of FIG. 23.
Figure 30:
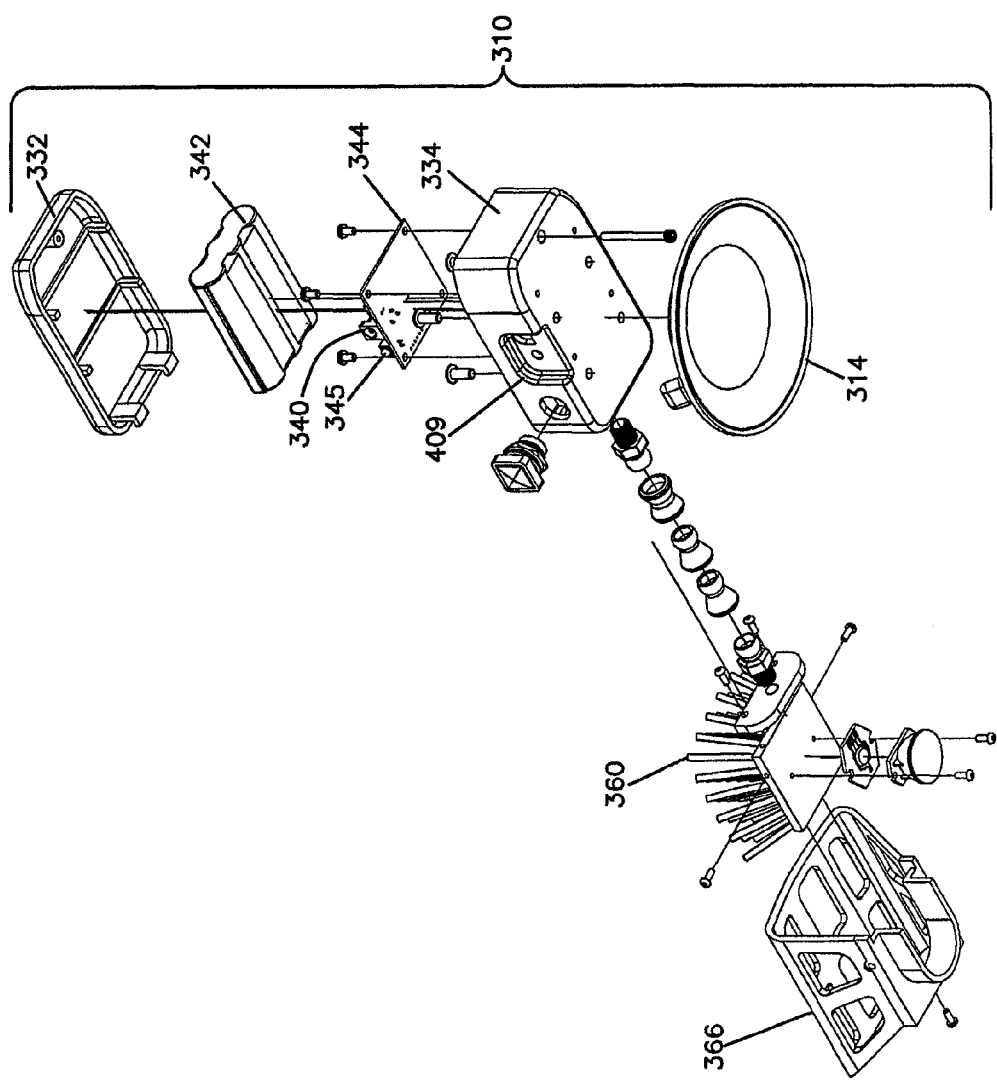
FIG. 30 is an exploded bottom perspective view of the curing lamp of FIG. 23.

The preferred embodiment includes at least two dies which emit light each at a different wavelength. Both 365 and 395 nanometers wavelengths are considered in the ultraviolet range. One advantage for providing UV light at 395 nanometers is that lamp apparatus 10 can be used from an opposite side of the windshield of an automobile. Compare FIG. 9 to FIG. 22. In FIG. 9, lamp apparatus 10 is shown on the same side of the windshield 100 as break 102. As shown in FIG. 22, lamp apparatus 10 is shown on an opposite side of the windshield 100, from break 102. Repair bridge 104 is mounted to exterior surface 106 of windshield 100. Lamp apparatus 10 is mounted to interior surface 108.

Windshield 100 includes an outer layer 110, a middle layer 112, and an inner layer 114. Typically, middle layer 112 is a plastic film layer. In the illustrated example, break 102 occurs within outer layer 110. Injector 116 of bridge 104 is a repair device used to apply repair resin 120 to break 102. As shown, injector 116 includes a pressure port 124 and a mechanical probe 126. Lamp apparatus 10 can be used on either side of windshield 100. Lamp element 20 includes emission of light at 365 nanometers which works with many resins to cause curing when used on the same side as the break.

As noted, lamp element 20 also emits light at a wavelength different from 365 nanometers. With such a construction, lamp apparatus 10 can cure resin through a windshield which includes polyvinyl butyral (PVB) treated to block UV light at 365 nanometers or other certain types of solar protective materials. The PVB layer (e.g., layer 112) tends to block light at 365 nanometer wavelengths, but passes the noted 395 nanometer wavelengths. The light blocking properties for layer 112 are beneficial as it reduces sunlight damage to an automobile's interior. However, the light blocking properties of windshield 100 prevent the 365 nanometer wavelengths from light source 20 of lamp apparatus 10 from reaching the resin to be cured. The 395 nanometer wavelength emitted from lamp element 20 is able to pass through windshield 100 in order to reach the applied resin material to be cured in break 102.

By allowing lamp apparatus 10 to be mounted on an opposite side of windshield 100, more room is available for the repair technician to access break 102. Also, curing from the bottom of break 102 allows for the resin to shrink into the crack as it cures.

The PCB 44 is equipped with a timer that is programmed to start when switch 38 is pushed and remain on for an appropriate length of cure time. In the example embodiment, five minutes is selected. The timer shuts off the light automatically. When switch 38 is pushed and held in during the five minute cycle, the lamp element 20 shuts off, after approximately 5 seconds. The cycle is started over again when switch 38 is pushed again. The input to the circuit of PCB 44 comes from two different sources. One input is a rechargeable battery, such as an 11.1 VDC lithium ion or lithium polymer battery. The second input is a barrel type DC receptacle jack 40 that can be accessed outside base 12 for an external battery source or a 12 VDC AC/DC converter. In the preferred embodiment, the circuit accepts 9-14 VDC and boosts it to approximately 18.5 volts controlling the current output at 270 milliamps (MA). Jack 40 is used to recharge the battery.

Referring now to FIGS. 10-21, additional details of lamp apparatus 10 are shown. Suction cup 14 mounts to bottom portion 34 of base 12 with screws 200 which pass through apertures 202 in bottom 34 into sockets 204 of suction cup 14. Bottom portion 34 of base 12 further defines a side aperture 206 for switch 38. A second side aperture 208 in recess 209 in bottom portion 34 aligns with power connector 40 mounted on PCB 44. PCB 44 mounts with screws 210 which are received in sockets 212 in bottom portion 34 after passing through apertures 214.

Base 12 defines a pocket for holding battery 42 above PCB 44. Bottom portion 34 includes a front rib 220 and a rear rib 222 which capture ends of battery 42. Side ribs 224, 226 include a middle channel 228. Top cover 32 includes a front tab 230 which is received in a slot 232 of bottom portion 34. Top ribs 234, 236 with middle channels 237 cooperate with side ribs 224, 226 for positioning of the battery. A fastener 238 passes through aperture 240 of bottom portion 34 and into a socket 242 of top cover 32. A front wall 244 of bottom portion 34 includes an aperture 246. Front aperture 246 receives an end of neck 16 and allows for electrical cables to pass out of base 12 and into neck 16 for passage to lamp head 18.

Neck 16 includes a first connector 248, a female/male connector 250, a male/male connector 252, and a second connector 254. Both first and second connectors 248, 254 are threaded for threadably mounting to base 12 and lamp head 18, respectively. Each of the elements of neck 16 includes one of the mating ball and socket connection ends which allow for three-dimensional bending movement, and rotation about the neck axis 48. More elements can be added if a longer neck 16 is desired.

Lamp head 18 includes a bulkhead plate 260 with an aperture 262 for receiving neck 16. Bulkhead plate 260 mounts with screws 266 through apertures 268 into sockets 270 of base 62 of heat sink 60. Housing 56 mounts with fasteners 280 through apertures 282 into sockets 272 also on base 62 of heat sink 60.

Heat sink housing 66 includes a body 170, with an open bottom 172 with a protective flange 174. Open ends 176 are provided on body 170. Sides 178 connect bottom 172 to top 180. Sides include first openings 179. Top 180 includes second openings 182.

Referring now to FIGS. 23-30, a lamp apparatus 310 for curing repair resin in accordance with another preferred embodiment of the present invention is shown. Lamp apparatus 310 is similar in many respects to lamp apparatus 10. Lamp apparatus 310 includes a base 312 including at least one suction cup 314 used for mounting lamp apparatus 310 to a windshield or other surface to be repaired. Extending from base 312 is a flexible neck 316 terminating in a lamp head 318. Lamp head 318 includes a lamp element 320 for emitting UV light on the windshield. Lamp element 320 emits light at at least two wavelengths like lamp element 20.

Base 312 includes a top cover 332 and a bottom portion 334 which form an enclosed housing for battery 342. Battery 342 and base 312 have a different shape relative to base 12 and battery 42 noted above. Base 312 closely surrounds battery 342 and the control circuitry.

Base 312 includes similar control circuitry for controlling lamp element 320. A PCB 344 with a control circuit is contained within base 312. Bottom portion 334 of base 312 includes a side aperture 408 in a recess 409 which aligns with a power connector 340 mounted on PCB 344. PCB 344 also includes an indicator light 345. When battery power becomes low (under 9 volts), indicator light 345 comes on and remains on until the battery is charged again.

Lamp head 318 includes a housing 356 which holds lamp element 320. Lamp head 318 also includes a heat sink 360 like heat sink 60 and a heat sink housing 366 to protect heat sink 360 from damage, and to protect the user from any sharp edges. Heat sink housing 366 includes a body 380 with various openings 382 to allow for airflow.

What is claimed is:

1. A method of repairing a glass structure comprising:
   applying resin to a crack on a first side of a structure to be repaired;
   mounting a base of a lamp apparatus to a second side of the structure to be repaired, the second side opposite to the first side;
   directing UV light from a lamp element connected to the base through the structure sufficient to cause curing of the resin.

2. The method of claim 1, wherein a portion of the UV light emitted from the UV light source is partially blocked by the structure from reaching the resin.

3. The method of claim 2, wherein the lamp element emits UV light at a first wavelength and a second wavelength different from the first wavelength.

4. The method of claim 3, wherein the glass structure includes a UV solar protective material and the UV light emitted at the first wavelength is at a wavelength that is able to pass through the UV solar protective material to cause curing of the resin.

5. The method of claim 4, wherein UV light emitted at the first wavelength has a wavelength of about 395 nanometers and the UV light emitted at the second wavelength has a wavelength of about 365 nanometers.

6. A method of repairing a windshield in an automobile, comprising:
   applying resin to a crack on an outside of the windshield to be repaired;
   mounting a base of a lamp apparatus to an inside of the windshield;
   directing UV light from a lamp element connected to the base through the windshield sufficient to cause curing of the resin, wherein a first portion of the UV light is at a first wavelength which passes through the windshield, and wherein a second portion of the UV light is at a second wavelength which is blocked by the windshield.

7. The method of claim 6, wherein the windshield includes a UV solar protective material and the UV light emitted at the first wavelength is at a wavelength that is able to pass through the UV solar protective material to cause curing of the resin.

8. The method of claim 7, wherein UV light emitted at the first wavelength has a wavelength of about 395 nanometers and the UV light emitted at the second wavelength has a wavelength of about 365 nanometers.

* * * * *